(12) United States Patent
Amano et al.

(10) Patent No.: US 12,393,177 B2
(45) Date of Patent: Aug. 19, 2025

(54) FACILITY OPERATION SYSTEM AND FACILITY OPERATION METHOD

(71) Applicant: Hitachi, Ltd., Tokyo (JP)

(72) Inventors: Koji Amano, Tokyo (JP); Hiroki Yamamoto, Tokyo (JP); Kazuma Sawada, Tokyo (JP); Kyohei Naka, Tokyo (JP); Hiroshi Yamada, Tokyo (JP); Yudai Zama, Tokyo (JP); Yusuke Imura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 390 days.

(21) Appl. No.: 18/192,981

(22) Filed: Mar. 30, 2023

(65) Prior Publication Data

US 2023/0324862 A1  Oct. 12, 2023

(30) Foreign Application Priority Data

Apr. 7, 2022 (JP) ................. 2022-063992

(51) Int. Cl.
*G05B 19/418* (2006.01)
*B25J 9/16* (2006.01)
(Continued)

(52) U.S. Cl.
CPC .......... *G05B 19/418* (2013.01); *B25J 9/1658* (2013.01); *B25J 9/1661* (2013.01); *G05B 15/02* (2013.01);
(Continued)

(58) Field of Classification Search
CPC ...... G05B 15/02; G05B 19/418; G06Q 10/06; G06Q 10/0631; G06Q 10/06316;
(Continued)

(56) References Cited

U.S. PATENT DOCUMENTS 9,880,997 B2 * 1/2018 Misra ................. G06F 40/30
11,501,255 B2 * 11/2022 Mann ................ G06F 16/24564
(Continued)

FOREIGN PATENT DOCUMENTS

JP  2020-201764 A  12/2020
JP  2021-057047 A   4/2021
(Continued)

*Primary Examiner* — Crystal J Barnes-Bullock
(74) *Attorney, Agent, or Firm* — Volpe Koenig

(57) ABSTRACT

A storage apparatus stores existing data including data relating to management of an instrument and data on actual records of the instrument, information on path structure of the existing data, mission information relating to a task in the facility operation, and information on the path structure of the mission information. An arithmetic operation apparatus extracts information on data meanings of terms contained in the existing data based on the existing data and the path structure of the existing data, and generates information of the degree of association between the plurality of terms. The arithmetic operation apparatus generates mission management information based on mission information, the path structure of the mission information, and the information on the degree of association between the terms, the mission management information including information on a meaning of each of a plurality of tasks relating to facility operation and chronological information on the plurality of tasks.

15 Claims, 21 Drawing Sheets

(51) Int. Cl.
  *G05B 15/02* (2006.01)
  *G06Q 10/0631* (2023.01)
  *G06Q 10/10* (2023.01)

(52) U.S. Cl.
  CPC ..... *G06Q 10/06316* (2013.01); *G06Q 10/103* (2013.01)

(58) Field of Classification Search
  CPC ... G06Q 10/101; G06Q 10/103; B25J 9/1658; B25J 9/1661
  USPC ............................................ 700/96; 705/301
  See application file for complete search history.

(56) References Cited

U.S. PATENT DOCUMENTS

2005/0080773 A1* 4/2005 Koike .................. G06F 16/316
2021/0097448 A1* 4/2021 San Miguel Gonzalez ................ G06N 20/20

FOREIGN PATENT DOCUMENTS

KR     20180122491 A  * 11/2018   ......... G06Q 10/0635
WO    WO-2022180487 A1 *  9/2022   ............. G06Q 10/20

* cited by examiner

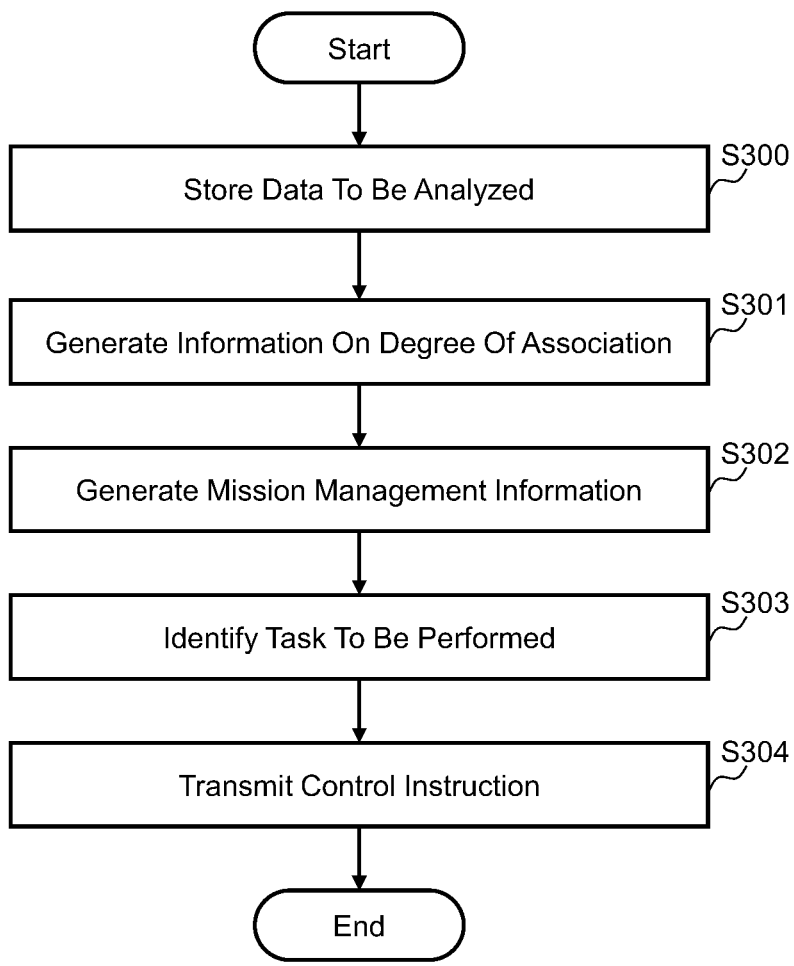

FIG. 5

| Structured Id Of Term (3-11A-1) | Term (3-11A-2) | Structured Id Of Technical Part Of Speech And Actual Use Records (3-11A-3) | Approved Score (3-11A-4) | |
|---|---|---|---|---|
| Common Root Id / Term 1 | Term 1 | [{"Technical Part Of Speech": "Noun / Company A / Apparatus Name / Filter Apparatus", "Usage": "4999"}, {"Technical Part Of Speech": "Noun / Company A / Apparatus Name / Replacement Parts", "Usage": "200000"}] | 100 | 3-11A-a |
| Common Root Id/ Term 1 | Term 2 | [{"Technical Part Of Speech": "Abbreviation / Noun / Company A / Apparatus Name / Filter Apparatus", "Usage": "49"}, {"Technical Part Of Speech": "Abbreviation / Noun / Company A / Apparatus Name / Replacement Parts", "Usage": "200"}] | 49 | 3-11A-b |
| Common Root Id/ Term 2 | Term 3 | [{"Technical Part Of Speech": "Noun / Company B / Preservation Sheet Api / Api1 / Input Form A1", "Usage": "4999"}, {"Technical Part Of Speech": "Noun / Company B / Apparatus Name / Replacement Parts", "Usage": "200000"}] | 80 | 3-11A-c |
| Common Root Id/ Term 3 | Term 4 | ... | 90 | |
| Common Root Id/ Abstraction 1 / Term 4 | Term 5 | ... | 90 | |

3-11A

FIG. 6
Technical Term Dictionary (Name)
Technical Part-of-speech Threshold Sheet 3-11B

| Action Id (3-11B-1) | Method For Calculating Approved Score (3-11B-2) | Approved Score (3-11B-3) | |
|---|---|---|---|
| Correction Based On Common Root Id / Humans | [{"Number Of Technical Parts Of Speech": "2", "Evaluation": ">="}] | 100 | 3-11B-a |
| Correction Based On Common Root Id / Automatic Process And Input Aid Actual Records | [{"Number Of Technical Parts Of Speech": "2", "Evaluation": ">="}] | 50-99 | 3-11B-b |
| Common Root Id / Automatic Process | [{"Number Of Technical Parts Of Speech": "2", "Evaluation": ">="}] | 0-49 | 3-11B-c |

FIG. 7

Mission Management Information Based On Relative Time (3-11a)

| Structured Id (Aggregate Information) (3-11A-1) | Relative Time (3-11A-2) |
|---|---|
| [{"Structured Id": "Common Root Id / Company A / Apparatus Id /Part Id", "Technical Part Of Speech": "Abbreviation / Noun / Company A / Apparatus Name / Filter Apparatus", "Structured Id Matching Rate": "100", "Usage": "200000"}, {"Structured Id": "Common Root Id / Company A / Api / Item Id", "Technical Part Of Speech": "Noun / Company B / Preservation Sheet / Api / Api1 / Input Form A1", "Matching Rate": "50", "Usage": "200"}] | Relative Time1 (3-11A-2a)<br><br>(3-11A-2b) |
| [{"Structured Id": "Common Root Id / Company A / Manual A / Maintenance Procedure B", "Technical Part Of Speech": "Abbreviation / Noun / Company A / Apparatus Name / Filter Apparatus / Maintenance Procedure", "Structured Id Matching Rate": "100", "Usage": "1000"}, {"Structured Id": "Common Root Id / Company A / Engineering Chatroom", "Technical Part Of Speech": "Noun / Company B / Preservation Chatroom / Information Filtering Rule A1", "Matching Rate": "100", "Usage": "1000"}] | Relative Time 2 (3-11A-2c) |
| ... | Relative Time3 |
| ... | Relative Time 4 (3-11A-2d) |

↑ S3-11-1a, S3-11-1b

History Data 5-a From Control Apparatus 6 Or Computer Apparatus For Control 7

| Logs Produced By Multiple Venders (5-A-1) | Log Time (5-A-2) |
|---|---|
| Term (Target), Term (State), Term (Unit), And The Like | Occurrence Time |
| Term (Target), Term (State), Term (Unit), And The Like | Occurrence Time |
| ... | Occurrence Time |
| ... | Occurrence Time |

FIG. 9

Automatic Operation Mission Visualized Screen (Scene Graph Representation)    1-1a Structured Id Of Mission    | Common Root Id / Mission 1 / Task 1 |

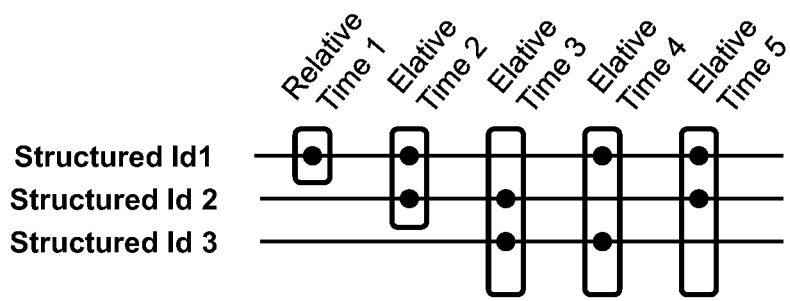

Automatic Operation Mission Visualized Screen (Sankey Representation)    1-1b Structured Id Of Mission    | Common Root Id / Mission 1 / Task 1 |

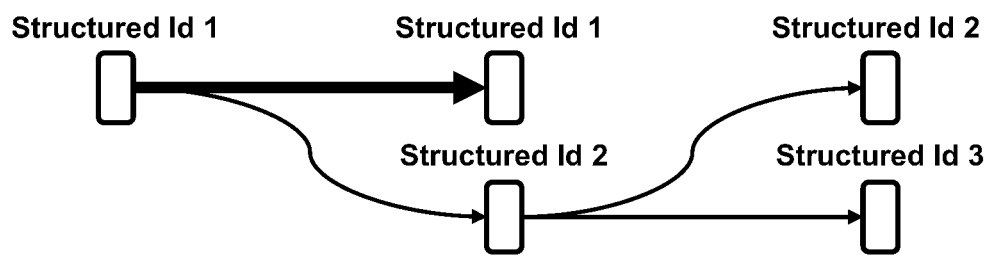

Automatic Operation Mission Visualized Screen (Gantt Chart Representation)    1-1c Structured Id Of Mission    | Common Root Id / Mission 1 / Task 1 |

Structured Swim-lane      Relative Time →

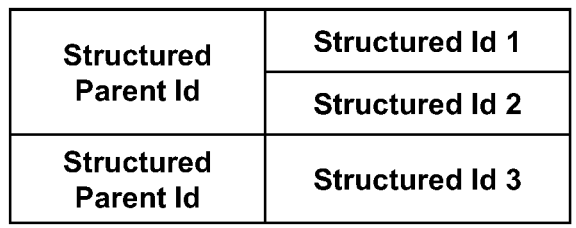

| Spelling | Term | Classification Specified By Os And Character Input Function | Priority |
|---|---|---|---|
| T E R M 1 | Term1 | Noun | 100 |
| T E R M 2 | Term2 | Noun | 50 |
| T E R M 3 | Term3 | ... | 80 |

FIG. 16

| Structured Id | Data, Mission, And Output Result Involving AI | Approved Score | Degree Of Contribution | Esg | Amount Of Payment |
|---|---|---|---|---|---|
| Common Root Id / Company A / AI1 | [{"Input Data": "Noun / Company A / Apparatus Name / Filter Apparatus", "Usage": "4999"}, {"Relationship Mission": "Noun / Company A / Apparatus Name / Replacement Parts", "Usage": "200000"}, {"Output Result": "Noun / Company A / Apparatus Name / Replacement Parts", "Usage": "200000"}] | 100 | # | # | # |
| Common Root Id / Company B / AI1 | | 50 | # | # | # |
| Common Root Id / Mission 2 | ... | 0 | # | # | # |
| Common Root Id / Mission 3 | ... | 80 | 3 | | |

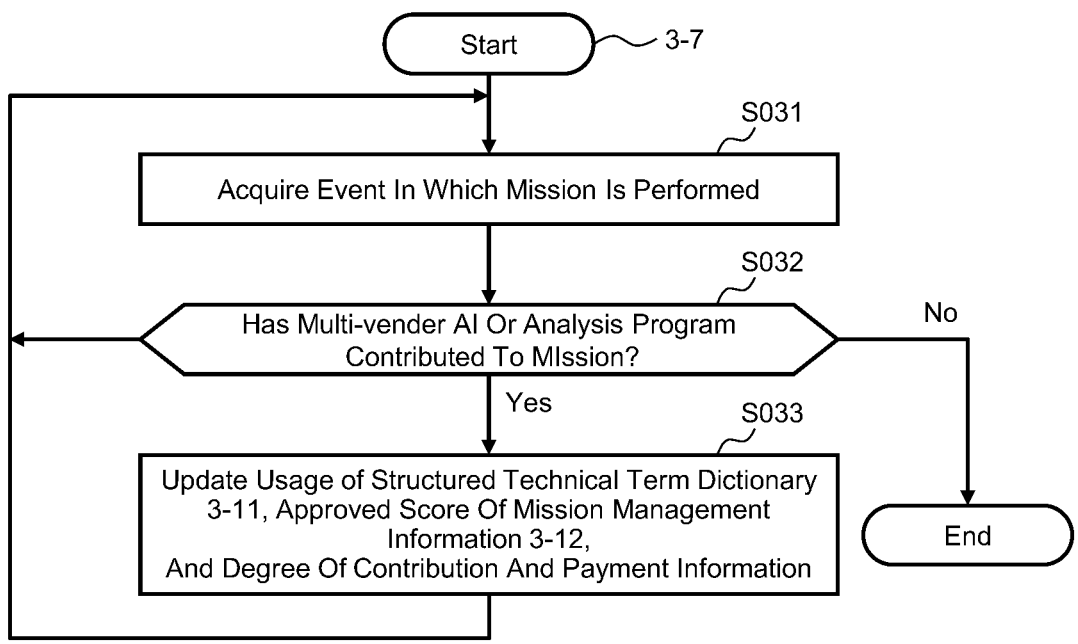

Fig. 17

FIG. 22
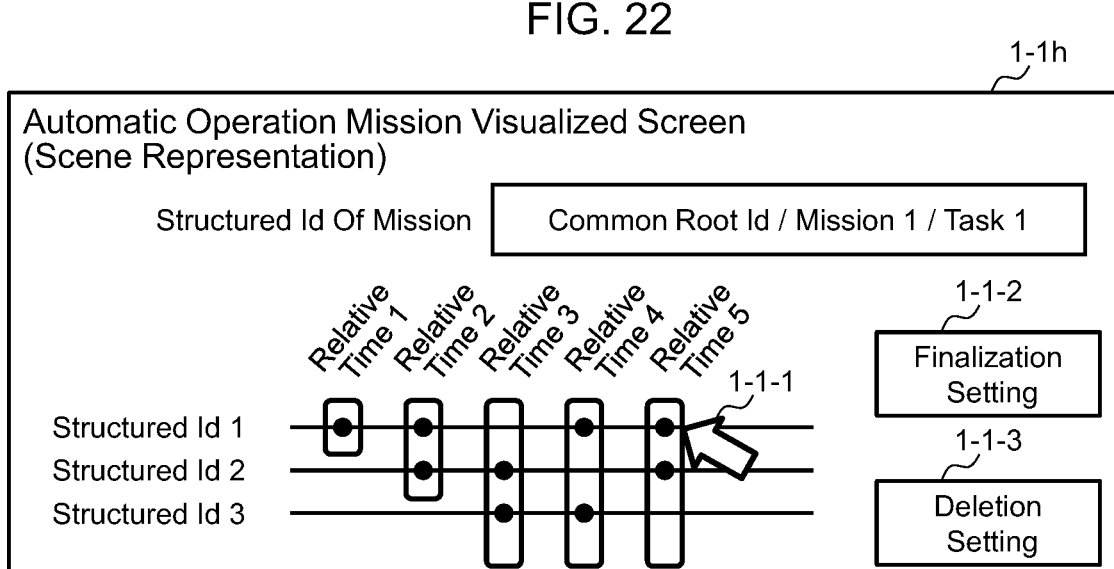
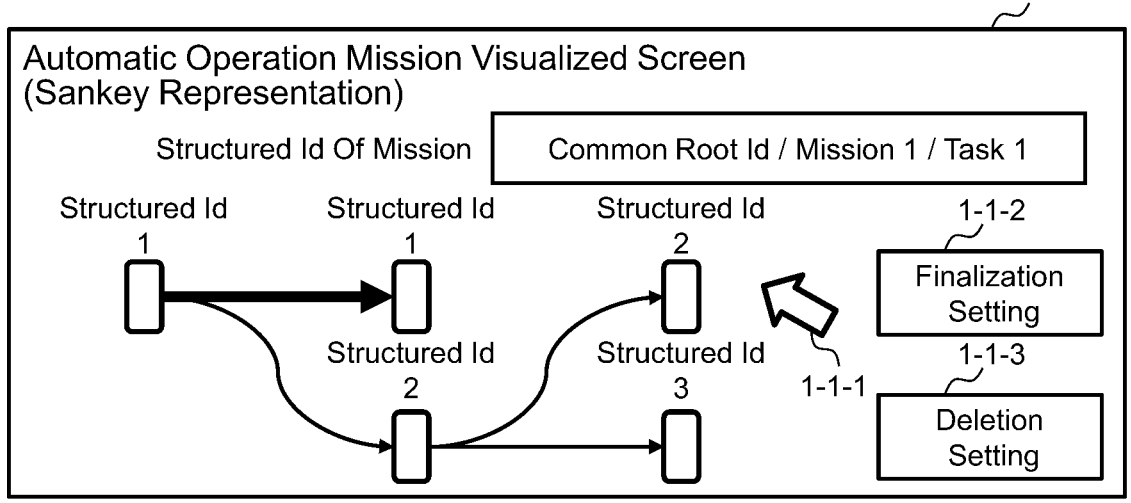
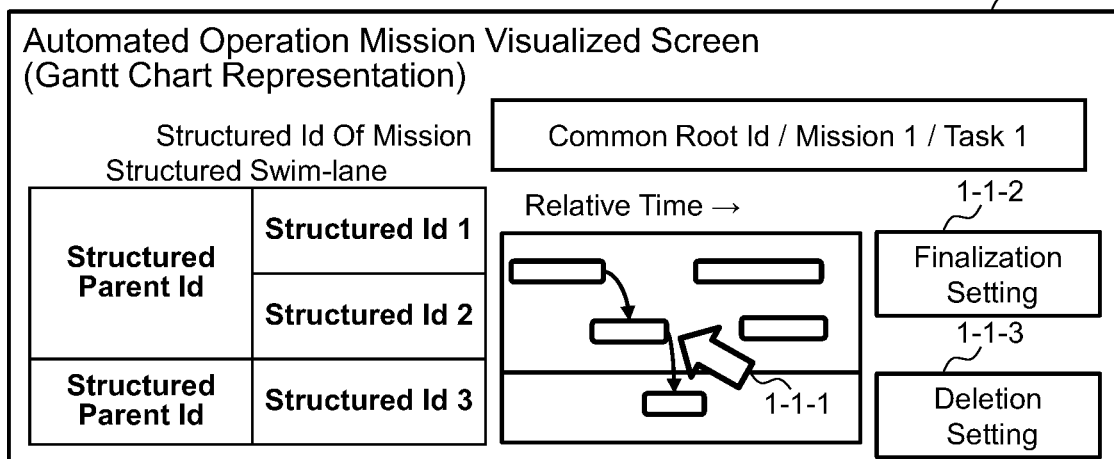

| Mission Id (3-12C-1) | Relationship Link (3-12C-2) | Automation Level (3-12C-3) |
|---|---|---|
| Id1 / Sub-mission 1 | {"Relative Time": "01:00:00", "From: {"Structured Id": "Common Root Id / Company A / Apparatus Id / Part Id", Relative Time: "1"}}, {"Relative Time": "02:00:00", "To: [{"Structured Id": "Common Root Id / Company A / Manual A / Maintenance Procedure B", "Usage": "100"}, Relative Time: "2", "Approved Score": "50"}]} | Fully Automated |
| ... | | Eyes Off |
| ... | | Skill A |
| ... | | Skill B |

| Mission Id (3-14A-1) | Relationship Facility (3-14A-2) | Operator's Level (3-14A-3) |
|---|---|---|
| Id1 / Sub-mission 1 | "Common Root Id / Plant A / Cold Section", "Plant B / Hot Section" | {"Fully Automated" + "Skill B"}, {"Fully Automated" + "Skill A"} |
| Id2 / Sub-mission 2 | "Common Root Id / Plant A / Cracking Furnace", "Common Root Id / Plant B / Raw Material Tank" | {"Eyes Off" + "Skill B"}, {"Eyes Off" + "Skill A"}, {"Skill A" + "Skill B"} |
| ... | | Skill A |

| Operator Id (3-14B-1) | Facility Relating To Operation Qualification (3-14B-2) | Operator Level (3-14B-3) | Guidance Tips (3-14B-4) |
|---|---|---|---|
| Operator A | "Common Root Id / C1 / Section A / Measurement Facility Type / Ultrasonic Sensor / I1" | {"Skill B"} | Five-Tier Structured Id (3-14B-4a) |
| Operator A | "Common Root Id / Plant B / Hot Section" | {"Skill A"} | Three-Tier Structured Id |
| Operator B | "Common Root Id / Plant B / Raw Material Tank" | {"Skill A"} | Three-Tier Structured Id (3-14B-4b) |
| ... | "Common Root Id / Plant B / Raw Material Tank" | {"Skill C"} | See Appendix For Details |

FIG. 27
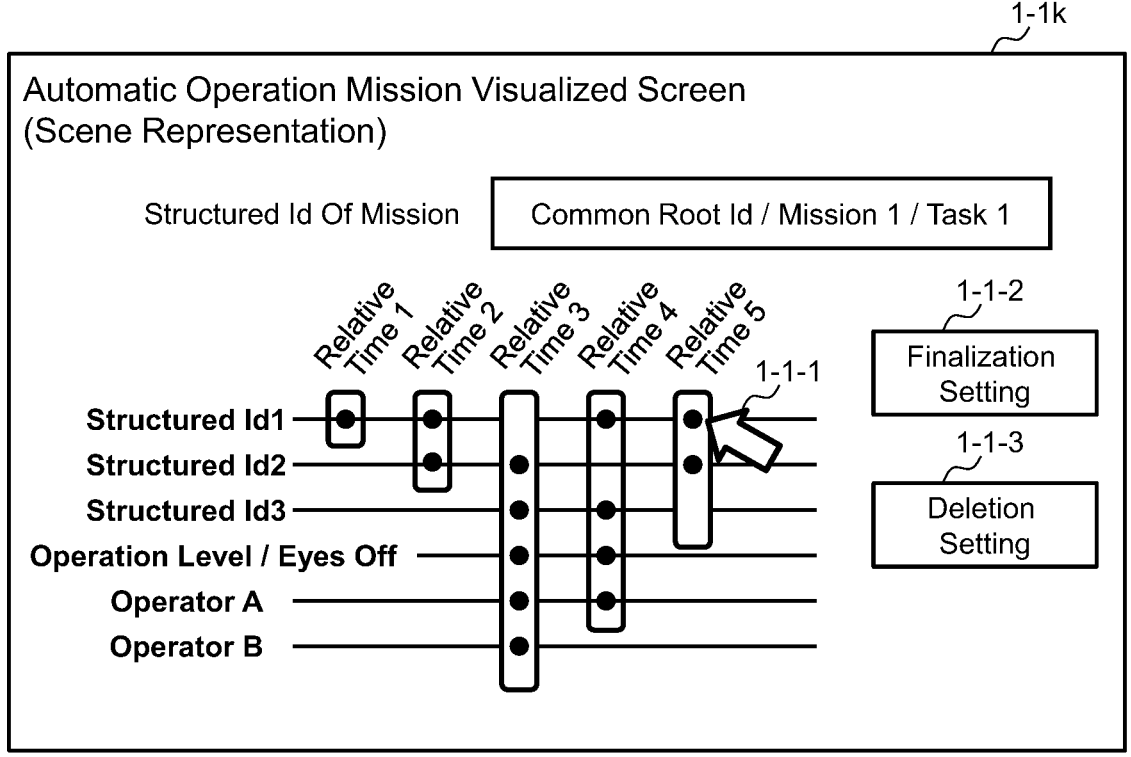
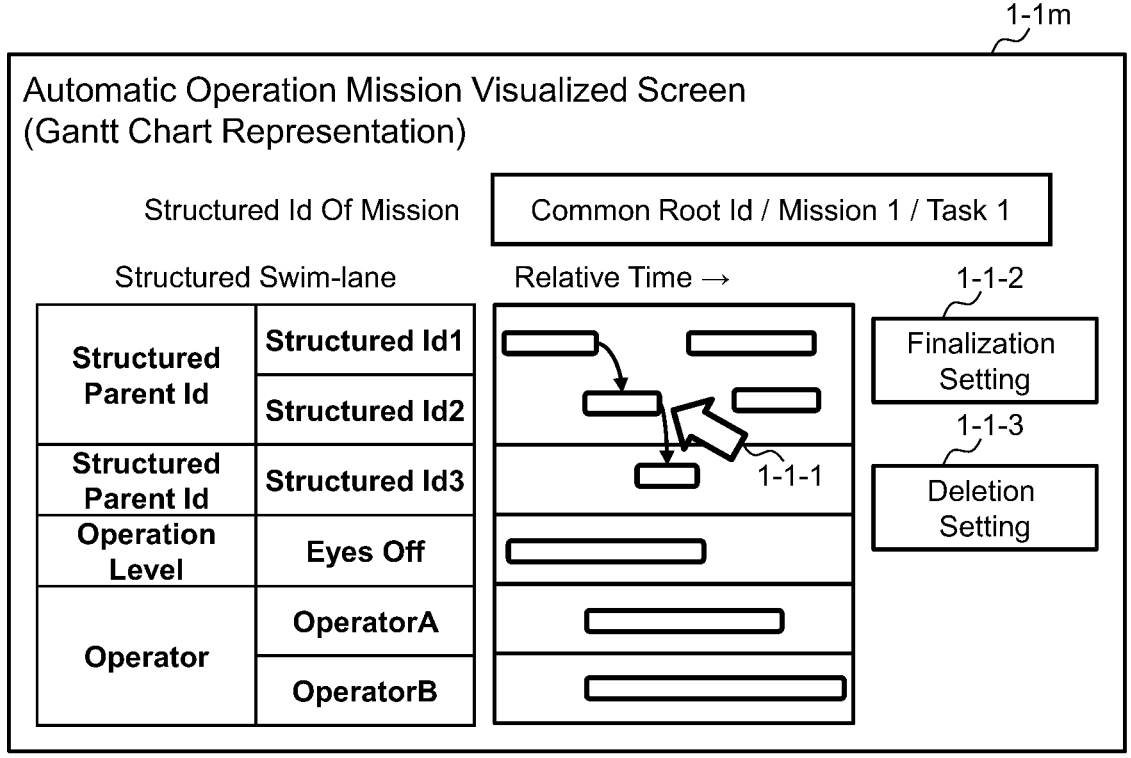

FACILITY OPERATION SYSTEM AND FACILITY OPERATION METHOD

BACKGROUND OF THE INVENTION

Field of the Invention

The present invention relates to a facility operation system and a facility operation method for operating a facility.

Description of the Related Art

To assist an increase in the efficiency of plant operation, a system has been proposed that utilizes artificial intelligence (hereinafter AI) to provide past information that contributes to an increase in the efficiency of facility operation. Such an AI can provide a classification function. That is, the AI can provide the category to which input information belongs or what should be an output provided in response to an input. An example of such an AI-based system is the technology described in Japanese Patent Laid-Open No. 2020-201764.

When AI is provided from multiple vendors or when data generated by multiple vendors are utilized, different representations may be used, or different results may be derived. Even with AI or data provided by multiple vendors, it is desirable to be capable of evaluating associated representations and results. An exemplary system relating to the above description is the technology described in Japanese Patent Laid-Open No. 2021-57047.

The related-art technologies allow reception of a past history that tells what should be done as a manufacturing task or a plant task based on measurable information such as values input from sensors. The related-art technologies also allow detection of differences due to different types of AI provided by multiple vendors. However, simply combining the features described above results in a difficulty in performing cooperation among the multiple vendors and automating tasks with human intervention, so that automatic operation of manufacturing or plant tasks cannot be undesirably performed. The cooperation among the multiple vendors and tasks with human intervention described above will now be described. In the related art, data provided by the multiple vendors or data input by humans may differ in expression or format, or incorrect data may have been mistakenly input, and it has therefore been difficult to automatically manage the associations among these pieces of information on the data. For the purposes of task operation, it has therefore been necessary for humans to evaluate the associations between the information provided by the multiple vendors and mission information that is chronological task operation information created by humans. Therefore, to achieve automatic operation of tasks, it is necessary to be capable of automatically managing the degree of difference among a variety of types of information, meanings included therein, and the associations therebetween even when the expressions and formats described above differ from one another or contain erroneous input. In view of the situations described above, to perform automatic operation of manufacturing or plant tasks, it is desirable to be capable of receiving data input by humans, input information provided by the multiple vendors, how processes proceed, and output results, discriminately expressing the associations between information on the meaning included in each information in the tasks and a variety of types of information, including mission information, which is chronological task operation information, and managing the result for facility control.

Japanese Patent Laid-Open No. 2020-201764 and Japanese Patent Laid-Open No. 2021-57047 described above do not consider viewpoints on management of mission information including time information for facility operation, or management for facility control by discriminately expressing the meanings included in a variety of pieces of information acquired in the course of tasks and the associations among the pieces of information.

The present invention has been made in consideration of the points described above and contributes to automation of operation of manufacturing or plant tasks.

SUMMARY OF THE INVENTION

To achieve the object described above, a facility operation system that represents the present invention includes a storage apparatus, an arithmetic operation apparatus, and a control apparatus that controls an instrument involved in facility operation. The storage apparatus stores at least a plurality of types of existing data including data relating to management of the instrument and data on actual records of the instrument, information on a path structure of the plurality of types of existing data, mission information that is information on a plurality of tasks in the facility operation, and information on a path structure of the mission information. The arithmetic operation apparatus extracts information on data meanings of terms contained in the plurality of types of existing data based on the plurality of types of existing data and the path structure of the plurality of types of existing data, generates information on a degree of association between the plurality of terms based on the extracted information on the data meanings, generates mission management information based on the mission information, the path structure of the mission information, and the information on the degree of association between the terms, the mission management information including information on a meaning of each of the plurality of tasks relating to the facility operation and chronological information on the plurality of tasks, identifies a task to be performed based on information acquired from the control apparatus and the mission management information, generates control instruction data for the control apparatus based on the identified task to be performed and the mission management information, and transmits the control instruction data to the control apparatus.

The present invention can contribute to automation of facility operation. Objects, configurations, and effects other than those described above will be apparent from the following descriptions of embodiments.

BRIEF DESCRIPTION OF THE DRAWINGS

FIG. 4 is a flowchart showing an overview of the process carried out by the facility operation automation system;

FIG. 5 shows the structure of a structured technical term dictionary;

FIG. 6 is a management table of rules for calculating an approved score in the structured technical term dictionary;

FIG. 7 describes the aggregation of mission information at relative time out of the result of conversion of history data into data that generates the mission management information in the process carried out by a facility operation mission management function;

FIG. 9 shows an example in which the mission management information is displayed on a display apparatus of the user terminal;

FIG. 15 is a system configuration diagram further containing information for managing AI that performs analysis, the degree of contribution made by a selected and executed mission, payment information according to the contribution, and the like;

FIG. 16 is an example of a table for managing degree of contribution and the payment information;

FIG. 17 shows a procedure in accordance with which the facility operation mission management function calculates the degree of contribution and the payment information;

FIG. 22 is an example of a screen that presents the mission management information to the user and permits the user to make corrections;

FIG. 24 is an example of a table showing the mission management information to which information on the automation level is added;

FIG. 25 is an example of a table that defines possible combinations as the combination of the automatic operation level and the operator's level in information showing the correspondence between the automation level and the operator's skill level;

FIG. 26 is an example of a table that defines the tiers of a structured ID of a guidance tip corresponding to the operator's skill level;

FIG. 27 is an example of a screen showing the automatic operation level and the response of an operator in charge in the mission management information displayed on the display apparatus of the user terminal;

DETAILED DESCRIPTION OF THE PREFERRED EMBODIMENTS

Figure 1:
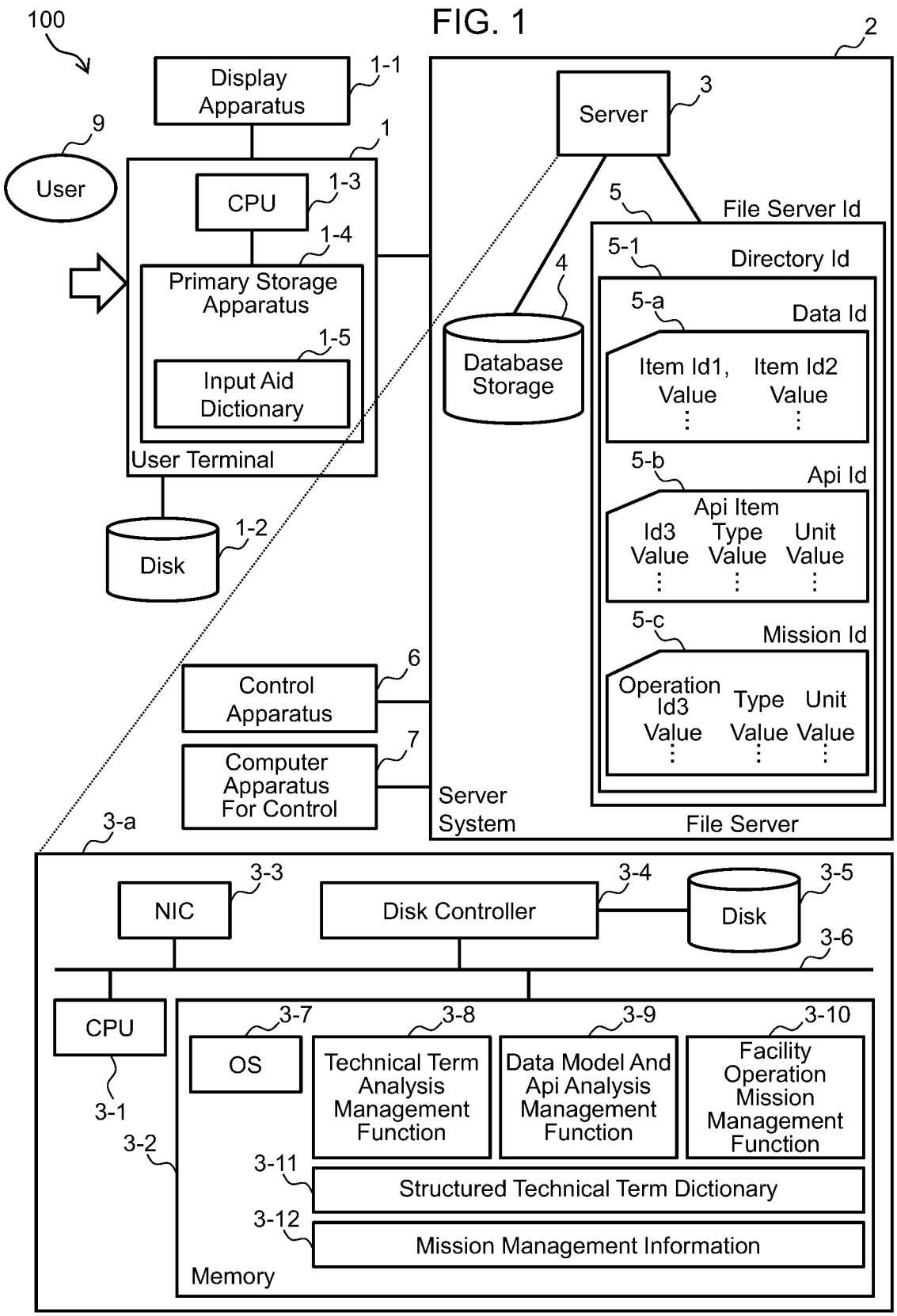
FIG. 1 shows a block diagram of an overall configuration of multi-vendor-cooperation-type facility operation automation.

Examples of embodiments for implementing the present invention will be described below with reference to the drawings.

In the present specification and drawings, note that components having substantially the same function or configuration have the same reference character and duplicated description thereof will be omitted.

Example 1

FIG. 1 is a block diagram showing the overall configuration of multi-vendor-cooperation-type facility operation automation.

A facility operation automation system 100 based on multi-vendor cooperation includes a user terminal 1 and a server system 2 as the facility operation automation system.

The user terminal 1 is a computer that accommodates a CPU (central processing unit) 1-3 and a primary storage apparatus 1-4, and is connected to peripheral instruments such as a display apparatus 1-1 and a disk 1-2, which is an auxiliary storage apparatus.

The user terminal 1 is responsible for providing information to a user 9 and transmitting conditions necessary for searching for information from the user 9 and work instruction information to the server system 2. The server system alone can correct input errors made by user and variations in expression, and the primary storage apparatus 1-4 also holds an input aid dictionary 1-5. The user 9 performs tasks via the user terminal 1 in cooperation with the server system 2.

The server system 2 includes one or more servers 3 and one or more database storages 4, which contain information in a tabular data structure defined by a table schema. In this case, "database storage/table schema ID/table column ID/key value for table row identification" can be created as identification information (structured ID).

The server system 2 includes one or more file servers 5. The file server 5 has a directory structure identifiable by a directory ID 5-1, and further manages information having data file IDs in the directory structure, for example, history data 5-a, API (application programming interface) definitions 5-b, mission information 5-c, which summarizes procedures for facility operation and plant operation, and other pieces of information as the file data.

The content of each file contains a variety of identification information that identifies the types of control target and facility operation, values, units, and other pieces of information.

In this case, the structured ID, which is structured identification information, is produced by the ID of the file server and the directory ID containing a directory tier structure, for example, as follows. In the case of a file data ID, "file server ID/directory ID/file data ID" can be created as the structured ID. In the case of an API file data ID, "file server ID/directory ID/API ID" can be created as the structured ID. In the case of a mission data ID having any of the variety of identification information on control targets and facility operations, "file server ID/directory ID/mission ID" can be created as the structured ID. As described above, the structured IDs are created from inclusion relationships shown in a variety of data, such as in tier structure directories, database schema tables, column and row identifiers in the database schemas, inclusion relationships in chapter and section structures in manual documents, indentation inclusion relationships, and information representing data associations, such as appendices for reference, remarks, and annotations. The inclusion relationships shown in a variety of types of data are also called path structures. Note that the inclusion relationships in the chapter and section structure of a document can be identified from the tier provided in the document, such as the document title, chapters, sections, headings, and words. The structured IDs are structured to represent in the same format the variety of types of data themselves and the inclusion relationships shown in the path structures used to manage the data, or what is called structured inclusion relationships.

A server 3-*a*, which is one of the one or more servers 3, will now be presented by way of example to describe the configuration of the server 3. The server 3 includes a CPU 3-1, which is an arithmetic operation apparatus, a memory 3-2, which is a primary storage apparatus, a network interface card (NIC) 3-3, a disk controller 3-4, and a disk 3-5, which is av auxiliary storage apparatus, and the components described above are connected to each other via a bus 3-6.

The CPU 3-1 develops programs and data in the memory 3-2 and sequentially executes the programs to achieve a variety of functions.

Specifically, process execution functions are developed in the memory 3-2, the functions including an OS (operating system) 3-7, a technical term analysis management function 3-8, a data model and API analysis management function 3-9, and a facility operation mission management function 3-10. In addition, data required for the process execution functions, such as a structured technical term dictionary 3-11 and mission management information 3-12, are also developed in the memory 3-2.

The OS 3-7 is a group of programs responsible for the control of the basic action of the server 3.

In addition, data required for the process execution functions, such as the structured technical term dictionary 3-11 and the mission management information 3-12, are also developed in the memory 3-2. The process execution functions, such as the technical term analysis management function 3-8, the data model and API analysis management function 3-9, and the facility operation mission management function 3-10, perform analysis and other types of processing on the directories, the structured IDs, such as databases, the history data 5-*a*, the API definitions 5-*b*, and the mission information 5-*c*, which summarizes facility operation and plant operation procedures, and other data, 5-*a*, 5-*b*, and 5-*c* existing as file data. That is, examples of the targets to be analyzed by the system include data relating to instrument management, and task data that are a plurality of types of existing data including data on the actual records of the instruments. The task data also contains terms in expressions used in the tasks, as will be described later.

When the multi-vendor-cooperation-type facility operation automation system 100 further includes a control apparatus 6 and a computer apparatus 7 for control, which are provided from the multiple vendors, and communicates with the apparatuses 6 and 7, the system 100 performs the communication in accordance with the file data and the API definitions 5-*b*, and communication operation logs are accumulated in the history data 5-*a*.

Figure 2:
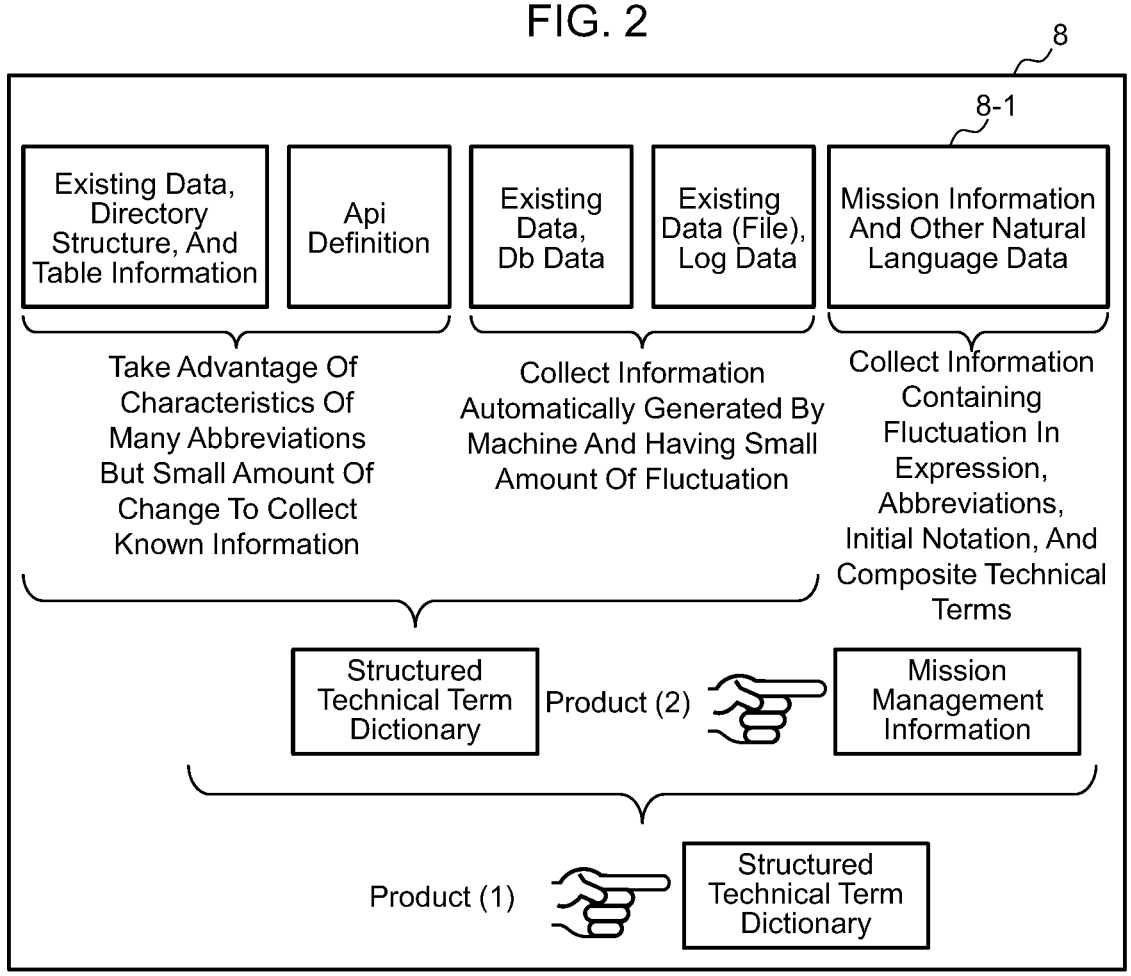
FIG. 2 is a descriptive diagram of an analysis management process performed by the multi-vendor cooperation-type facility operation automation system.

FIG. 2 is a descriptive diagram of an analysis management process 8 performed by the multi-vendor cooperation-type facility operation automation system 100. The processes carried out by the facility operation automation system include generation of the structured technical term dictionary 3-11 and the mission management information 3-12, as shown in FIG. 2.

The creation of the structured technical term dictionary will be described. The information stored in the database storage 4 and the file server 5 is not described in a uniform expression, a uniform degree of detail, or a uniform meaning. Therefore, to automate the facility operation more efficiently, it is desirable to process information from data recognizable by computer systems.

The server 3 extracts abstract-side data meanings from the directory structure and table information in existing data and generates parent-side identifiers of the structured IDs through the processes described in FIG. 11, FIG. 12, and other figures, which will be described later. Furthermore, since the definition of a program API is also data recognized by computer systems, the tier structure and data semantic identifiers, such as namespaces contained within the program API, are extracted to generate the parent-side identifiers of the structured IDs.

The data meaning of a term indicates a meaning of the data itself to be processed or the term used in the management of the data, the meaning commonly recognized by those involved in the process. For example, when different terms are recognized as having the same meaning in the same group, the terms are notational variations of the same data meaning. On the other hand, when a single term is used as having different meanings in different groups, the term has different data meanings in the different groups. Therefore, identifying the location where a term is used by using the tier structure, and analyzing the actual use of the term allows acquisition of information on a data meaning corresponding to the notational variation and dependence on a group.

Thereafter, the relationship between the generated parent-side identifiers and more detailed child-side identifiers is utilized to sense the degree of similarity between terms that do not exactly coincide with each other, whether or not the terms are abbreviations, and so on to create a structured technical term dictionary, which is a first dictionary. The information is a first product produced by the facility operation automation system. The structured technical term dictionary used herein is information on the degree of association between a plurality of terms. In comparing the structured IDs with each other, the neighborhoods of the target identifier are compared with each other, rather than all the tiers thereof, so that the meaning can be interpreted and a dictionary can be generated even when the structured IDs do not exactly coincide with each other. For example, when a string "operation A" contained in a manual is used at a plurality of locations in a tier structure of " . . . /apparatus X/cooling/operation A/action C/ . . . ", the strings "operation A" at the plurality of locations have the same meaning even letters before and after the strings do not coincide with each other. This is the process of adjusting and comparing the number of concatenations (magnitude of comparison between parent-side and child-side identifiers) of identifiers of strings containing the delimiter "l" indicating the inclusion relationship.

DB data, which store data collected from the control apparatus 6 and the computer apparatus 7 for control, and log data in a file format can be automatically generated by the machines, whereby information with a small amount of variation can be collected. In addition to technical terms, the log data have chronological information required to understand a mission, and unlike a dictionary that is a simple collection of terms, the log data contain information that involves backward and forward, parallel, differentiation, and integration relationships. The server 3 analyzes the data and creates a structured technical term dictionary. The information is the first product produced by the facility operation automation system, which utilizes the first dictionary generated before to further increase the number of definitions.

Terms used for tiers, data, items, values, and the like in existing data used to manage data to be managed are likely to be recognized as sufficiently generic and clear terms for persons involved in the task (persons involved in task). In addition, the terms used in the management are likely to be associated with the task with little notational variation. It is therefore considered effective to include the terms used to manage data to be managed as task data under analysis.

Information on a mission, which is information on a mission formed of a plurality of tasks for the operation of a facility or a plant, is stored in the mission information 5-c. The mission information 5-c represents information necessary to carry out a plurality of tasks in facility operation, such as targets, conditions, states, target values, control values, and rates of change of the tasks, as well as the chronological relationship or the context of the necessary information. The mission information is written in a natural language, for example, in a manual, and is difficult for computer systems to recognize. Therefore, the structured technical term dictionary, which is the first product automatically generated before, is utilized to analyze high-level and lower-level concepts, abbreviations, initial notations, and the like with a computer as much as possible. Mission data created in a natural language based, for example, on a chapter structure, numbering, and indentation is analyzed, and explainable digital mission management information is generated. The information is a second product produced by the facility operation automation system. The information necessary to identify information associated with a specific term, such as directories, chapter structures, numbering, and indentation contained in the mission information, is called a path structure of the mission information. The server 3 then extracts the path structure of the mission information and a semantic identifier of the information from the mission information and generates an identifier of the structured ID, as in the creation of the first product. The order of appearance of information contained in the path structure of the mission information often corresponds to the chronological context of information in contained the mission management information, so that the chronological context of information contained in the mission management information can be analyzed based on the path structure of the mission information.

Figure 3:
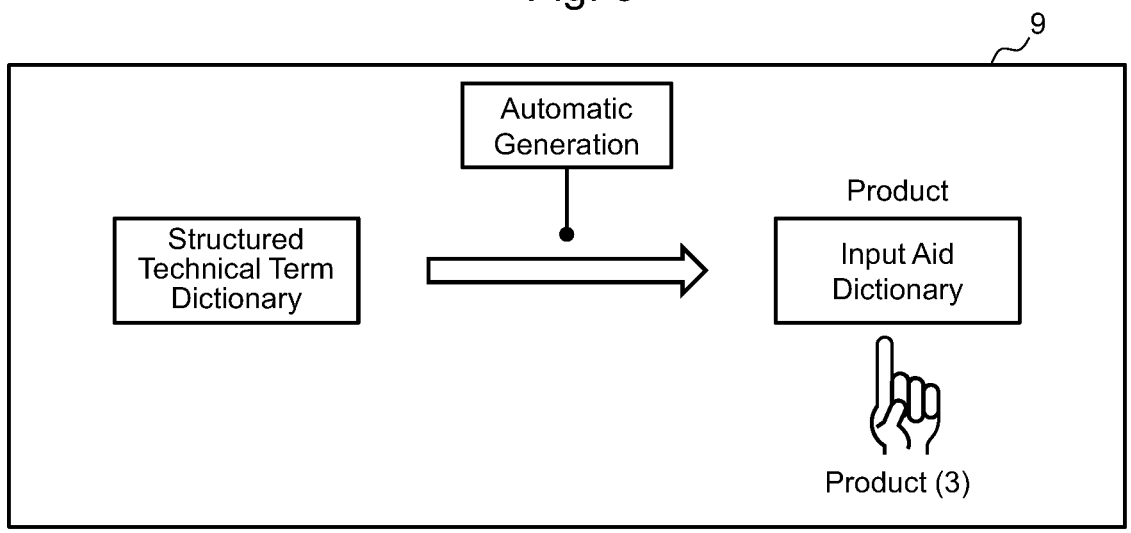
FIG. 3 is a descriptive diagram of the process performed by the multi-vendor-cooperation-type facility operation automation system for a user terminal.

FIG. 3 is a descriptive diagram of the process 9 performed by the multi-vendor-cooperation-type facility operation automation system for a user terminal. Even when AI is used, the analysis process described in FIG. 2 may err in the tolerance range, sign distance evaluation, and distance evaluation performed by the AI if the user terminal 1 is not provided with the function of reducing human-induced variations. Therefore, to increase the accuracy of the analysis management process 8 carried out by the server 3, thoughts and sorting of terms input by the user are displayed in correspondence with known information, and information for aid of the user's input is generated as an input aid dictionary. The information is a third product produced by the facility operation automation system.

Utilizing the third dictionary provides the effect of governing the data meanings used in the system for resultant automatic operation. The server 3 can use the first to third products to unify the directory names, file names, and terms presenting the contents performed in preservation and make announcements to the persons involved in the task, whereby the processes having been handled by humans can be automated.

FIG. 4 is a flowchart showing an overview of the process carried out by the facility operation automation system.

The database storage 4, the file server 5, or any other component that is a storage apparatus, first stores data to be analyzed (step S300). The data to be analyzed includes a plurality of types of existing data including data relating to the management of an instrument and data on the actual records of the instrument, information on the path structure of the plurality of types of existing data, the mission information, which is information on a plurality of tasks in the facility operation, and information on the path structure of the mission information.

The server 3, which is the arithmetic operation apparatus, generates the structured technical term dictionary, which is information on the degree of association, from the data to be analyzed (step S301). The structured technical term dictionary is generated by extracting information on the data meanings of terms contained in the plurality of types of existing data based on the plurality of types of existing data and the path structures of the plurality of types of existing data, and evaluating the degree of association between the plurality of terms based on the extracted information on the data meanings.

The server 3 further generates the mission management information (step S302). The mission management information is generated based on the mission information, the path structure of the mission information, and the structured technical term dictionary. The mission management information contains a structured ID of each of the plurality of tasks relating to the facility operation and chronological information on the plurality of tasks. In addition, the server 3 generates the input aid dictionary. The data generated in step S302 shows information based on which a task has been operated and how the task has been operated, and the generated data can be displayed and output as the result of the analysis.

The server 3 identifies a task to be performed based on information acquired from the control apparatus 6 and the mission management information (step S303).

The server 3 generates control instruction data in accordance with which the control apparatus 6 is controlled based on the identified task to be performed and the mission management information, and transmits the control instruction data to the control apparatus 6 (step S304). The facility operation automation system thus recognizes information generated by the multiple vendors and processes that require human intervention, and carries out processes that can be performed without human intervention or processes that the facility operation automation system can perform on behalf of the user.

FIG. 5 shows the structure of the structured technical term dictionary. The contents of the data can also be viewed on the display apparatus 1-1 of the user terminal 1.

FIG. 5 shows a table 3-11A of managed information in the structured technical term dictionary. The table 3-11A in the structured technical term dictionary contains a column 3-11A-1 for the structured ID of a term that can be uniquely identified in the facility operation automation system, a column 3-11A-2 for notation data in which the term is expressed, a column 3-11A-3, which manages structured technical term part-of-speech information and an actual use of the term, and an approved score column 3-11A-4, which identifies how much the term has been approved.

The column 3-11A-2 shows that in a row 3-11A-a, which manages a term 1, the "term 1" is used as an expression method, and the column 3-11A-1 shows that the structured ID of the term 1 is managed by the "common root ID/term 1". Furthermore, the column 3-11A-3 shows that the "term 1" is as a technical part of speech "noun/company A/apparatus name/filter apparatus", and that the "term 1" has structured technical part-of-speech information "noun/company A/apparatus name/replacement parts". Moreover, statistics information on how many times the term has been used is managed. The approved score column 3-11A-4 shows a value set at "100," which indicates that the information has been modified once through human intervention and has become very reliable structured technical term information.

The column 3-11A-2 shows that in a row 3-11A-b, which manages a term 2, the "term 2" is used as the expression method. The column 3-11A-1, however, shows that the structured ID is the "common root ID/term 1", and that the "term 2" is managed as a separate notation but has the same meaning as the "term 1". Furthermore, the column 3-11A-3 shows that the "term 2" is as a technical part of speech "noun/company A/apparatus name/filter apparatus", and that the "term 2" has structured technical part-of-speech information "noun/company A/apparatus name/replacement parts". Moreover, statistics information on how many times the term has been used is managed. The usage indicates that the "term 2" is not used as many times as the "term 1" having the same meaning but in the separate notation is used. The approved score column 3-11A-4 shows a value set at "49", which indicates that the technical terms are automatically collected by the technical term analysis management function 3-8 and the data model and API analysis management function, so that the "term 2" is information that has not yet been corrected by humans or by input aid actual records, and it cannot hence be said that the "term 2" is reliable.

The column 3-11A-2 shows that in a row 3-11A-c, which manages a term 3, the "term 3" is used as the expression method. The column 3-11A-1 shows that the structured ID of the "term 3" is the "common root ID/term 2". Furthermore, the column 3-11A-3 shows that the technical part of speech of the "term 2" is multi-vendor "noun/company B/preservation sheet/API/API1/input form A1", and that the "term 2" has structured technical part-of-speech information "noun/company B/apparatus name/replacement parts". Moreover, statistics information on how many times the term has been used is managed.

The approve score column 3-11A-4 shows a value set at "80", which indicates that the technical terms are automatically collected by the technical term analysis management function 3-8 and the data model and API analysis management function, and that the "term 2" is information that has been corrected by input aid actual records but has not been checked or corrected by humans.

FIG. 6 is a management table 3-11B of rules for calculating the approved score in the structured technical term dictionary.

The management table 3-11B of the rules for calculating the approved score has information on a calculation method 3-11B-2 for calculating the approved score for an action ID 3-11B-1, which identifies a detected action, and has a numerical range 3-11B-3 of values that can be given as the approved score.

An action 3-11B-a for the row of a human-corrected structured technical term in 3-11B indicates that the approved score is "100".

When a dictionary is generated by an automatic process and corrections are made based on the input aid actual records (3-11B-b), an approved score between "50 to 99" is given.

When a dictionary is generated by an automatic process but no input aid actual records have been present or humans corrections have not been made (3-11B-c), the definition that the approved score between "0 to 49" is given is managed.

The degree of reliability utilizing the approved score for the terms managed in 3-11A can thus be assessed. When a task that has been corrected or approved via the user terminal is recognized as described above, the approved score for each term in the task increases. When the approved score of a term increases, the term is more likely to be employed in the mission management information than an automatically generated but unapproved term. That is, an increase in the approved score controls the priority of selection of a task. As a result, an approved task can be preferentially selected and executed.

The mission management information 3-12 can be generated based on the mission information 5-c and the structured technical term dictionary, which is the first product. The thus created mission management information 3-12 also contains information on the chronological relationship and the context of each procedure and the other pieces of information contained in the mission information 5-c. Furthermore, in addition to the method described above, the mission management information 3-12 can be generated so as to contain chronological information held by the history data 5-a, as shown by way of example in the description of FIG. 7, which will be described later. The chronological relationship among the procedures can therefore be corrected based on the history of how the procedures have each been actually performed, whereby the mission management information 3-12, which reflects the target facility status more correctly, can be generated. What is referred herein to as the procedures can also be replaced in the present example with a unit operation, a process, a step, or a mission in the facility operation.

FIG. 7 describes the aggregation of the mission information at relative time out of the result of conversion of the history data 5-a and the mission information 5-c into data that generates the mission management information 3-12 in the process carried out by the facility operation mission management function 3-10.

The information on history data 5-A contains in many cases information 5-A-1 on terms relating to the target, terms relating to a target and current values or the state, and terms relating to the unit, and the like, and log time 5-A-2, at which the information occurs, is managed. To aggregate the pieces of information described above with statistical processing and other types of processing performed, it is necessary to convert the log time 5-A-2 into information on relative time 3-11A-2.

To statistically process past data that occur at completely different points of time, a target is selected by utilizing the context information on the information managed in the information portion 5-A-1 showing the contents (processes S3-11-1a and S3-11-1b), and information is added to the values of 3-11A-2a to 3-11A-2d.

In the management table 3-11A relating to the relative time out of the mission management information, structured IDs into which the target terms, the state terms, the unit terms, and other terms are converted by the structured technical term dictionary, are managed in the column 3-11A-1. In the example 3-11A-1, structured IDs including structured technical parts of speech are managed, and a structured ID matching rate ranging from the exact match to a partial match, and the usage are managed. Relative time 3-11A-2 is managed to manage the context of each row in 3-11A.

Figure 8:
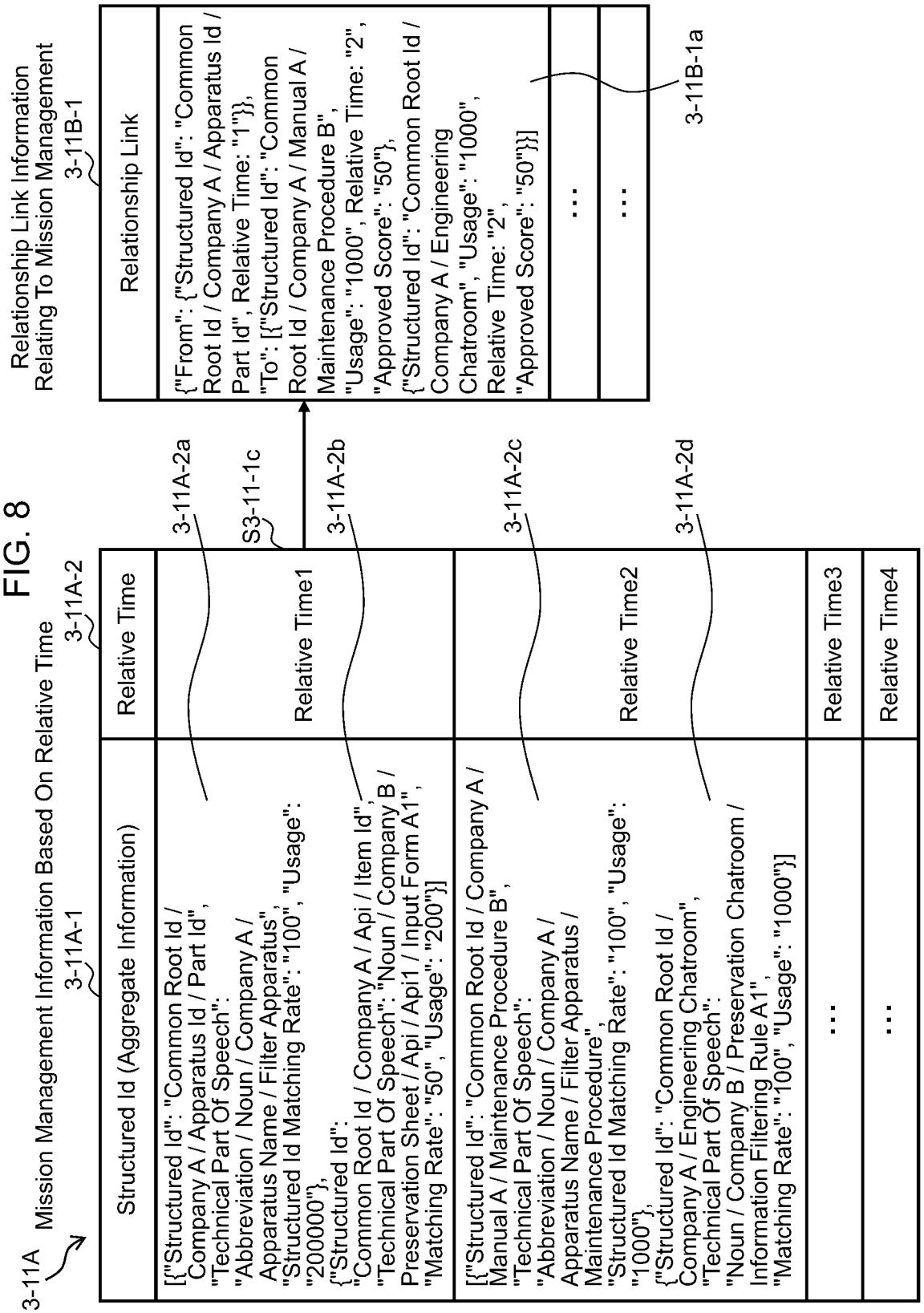
FIG. 8 shows a case where the facility operation mission management function utilizes the mission management information at relative time to generate relationship link information on the mission context information, and describes how the former information is changed to the latter information.

FIG. 8 shows a case where the facility operation mission management function 3-10 utilizes the mission management information 3-11A at relative time to generate relationship link information 3-11B-1 on the mission context information, and describes how the former information is changed to the latter information.

The facility operation mission management function 3-10 carries out a relationship link generation process S3-11-1C to generate a relationship link of a relationship 3-11B-1a between the structured IDs of the structured technical terms.

In 3-11B-1a, the structured IDs, the usage thereof, the relative time, and the approved scores are managed along with a notation that allows ascertainment of the context between From and To.

FIG. 9 shows an example in which the mission management information 3-12 is displayed on the display apparatus 1-1 of the user terminal 1. A display example 1-1a is an example in which the mission management information 3-12 is displayed in a scene graph representation.

A display example 1-1b is an example in which the mission management information 3-12 is displayed in a Sankey representation, and the thickness of the arrow expresses the usage managed in the mission management information 3-12. A display example 1-1C is an example in which the mission management information 3-12 is displayed in a Gantt chart representation, and shows a structured swim-lane representation utilizing the information on the structured IDs, and a Gantt chart at the relative point of time when the process is carried out.

The display examples are shown in the relative time, and can instead be shown in future time in a case where the mission start time is fixed.

Generating the mission management information 3-12 from the history data 5-a and the API definition 5-b allows preparation of interpretation of the mission information 5-C, which is written in a natural language and difficult for computers to recognize. Comparing the mission information 5-C with data on the mission management 3-12 allows determination of a mission the log of which is the history data 5-a.

Figure 10:
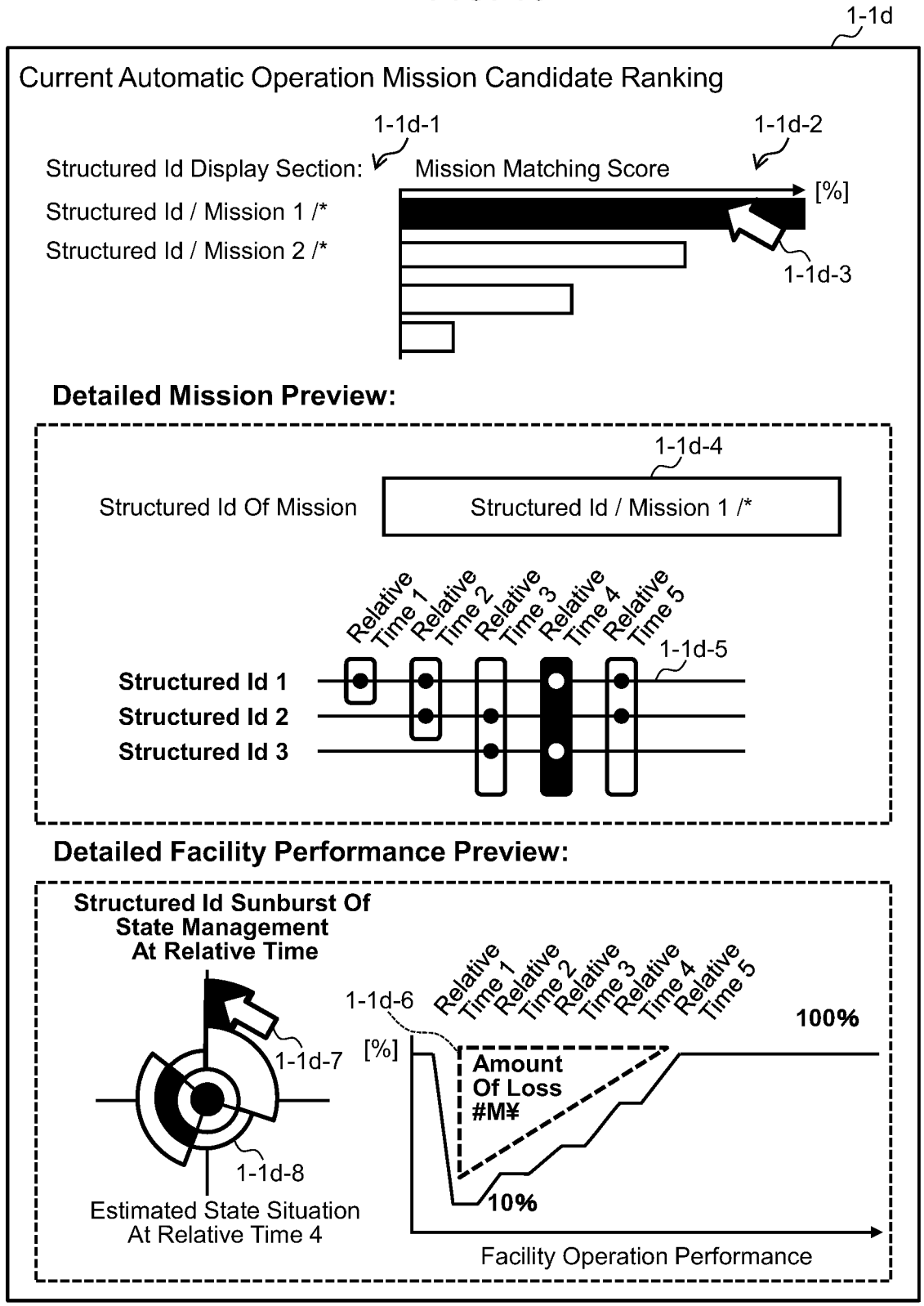
FIG. 10 is a screen example in which the mission management function displays on the display apparatus the rankings in accordance with which automatic operation missions should be executed by determining the current status based on information from a control apparatus and a computer apparatus for control.

FIG. 10 is a screen example 1-1d, in which the facility operation mission management function 3-10 displays on the display apparatus 1-1 the rankings in accordance with which automatic operation missions should be executed by determining the current status based on information from the control apparatus 6 and the computer apparatus for control 7 or input via the user terminal as a trigger.

The automatic operation screen shows structured IDs 1-1d-1 of the missions selected from the current status information, and mission matching scores 1-1d-2, which represent how the missions match the current status. When the target or score of any of the missions is clicked (1-1d-3), the target mission is selected in a detailed mission preview 1-1d-4, and a content 1-1d-5 is displayed.

A detailed facility performance preview shows a currently occurring problem and other locations in a sunburst diagram 1-1d-8. When the location of the problem is clicked to select a mission that addresses the problem, an estimate 1-1d-6 of the amount of loss of performance is displayed.

Figure 11:
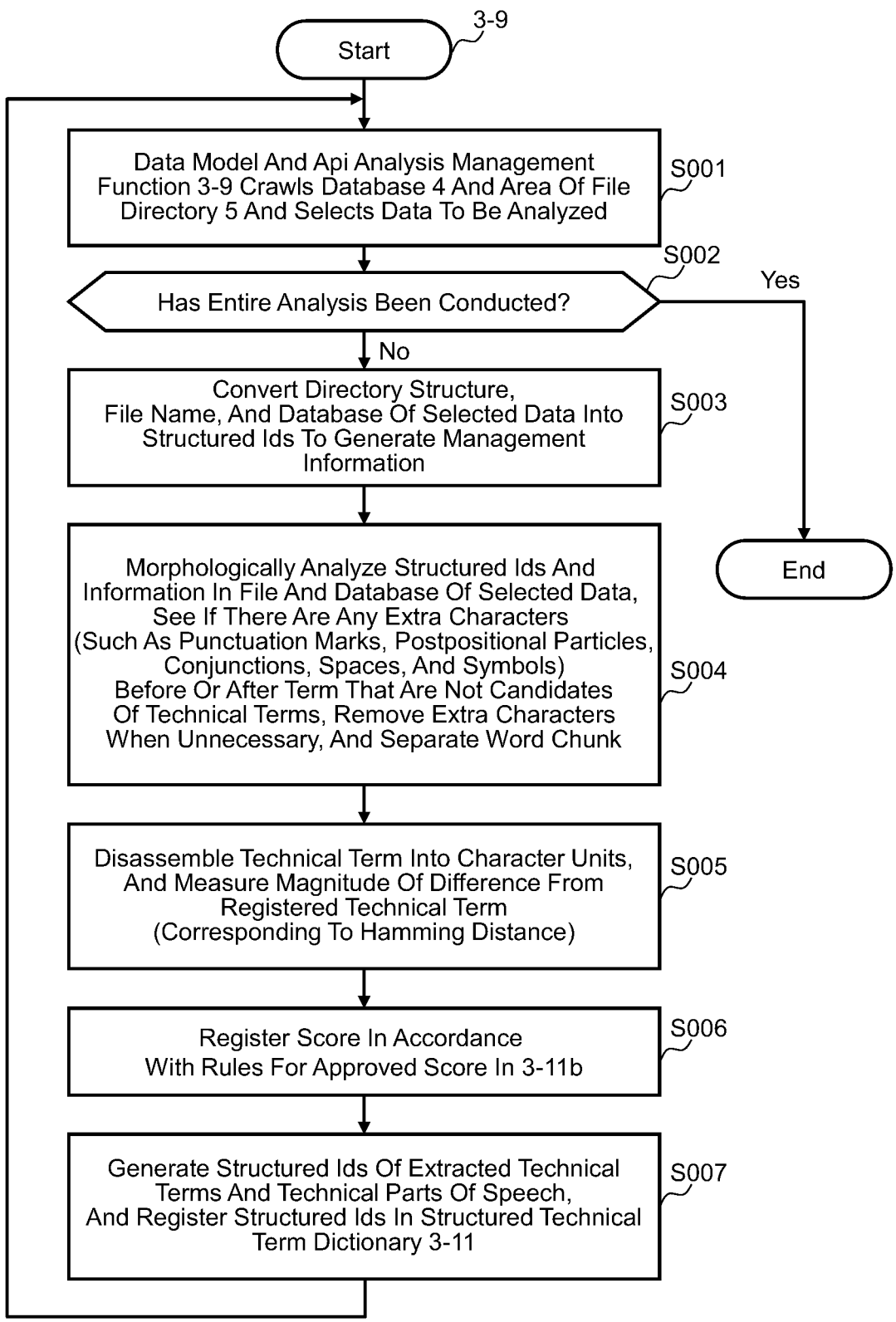
FIG. 11 is the process procedure in accordance with which a data model and API analysis management function creates the structured technical term dictionary.

FIG. 11 is the process procedure in accordance with which the data model and API analysis management function 3-9 creates the structured technical term dictionary. The data model and API analysis management function 3-9 crawls the database 4 and the region of the file directory 5 to select data to be analyzed (S001). Thereafter, when data to be selected are left so that the entire analysis has not been conducted ((No) in S002), the directory structure, the file name, and the database of the selected data are converted into the structured IDs to generate management information (S003). On the other hand, when the entire analysis is completed ((Yes) in S002), the action is terminated.

When there is a target to be analyzed, the content of the file is opened, and the structured IDs of the selected data and the information in the file and the database is morphologically analyzed to see if there are any extra characters (such as punctuation marks, postpositional particles, conjunctions, spaces, and symbols) before or after the term that are not candidates of technical terms, the extra characters are removed when unnecessary, and the word chunks are separated (S004).

The technical terms are each then disassembled into character units, and the magnitude of the difference from each registered technical term is measured. The difference is determined by using Hamming distance or any other technique. The data model and API analysis management function 3-9 identifies the determined difference as a distance that can be compared in terms of magnitude (S005). A score is registered in accordance with the rules for the approved score in 3-11B. The difference in the distance in the process S005 is utilized to assign a superiority or inferiority to the score (S006). Structured IDs for the extracted technical terms and technical parts of speech are then generated and registered in the structured technical term dictionary 3-11 (S007).

Figure 12:
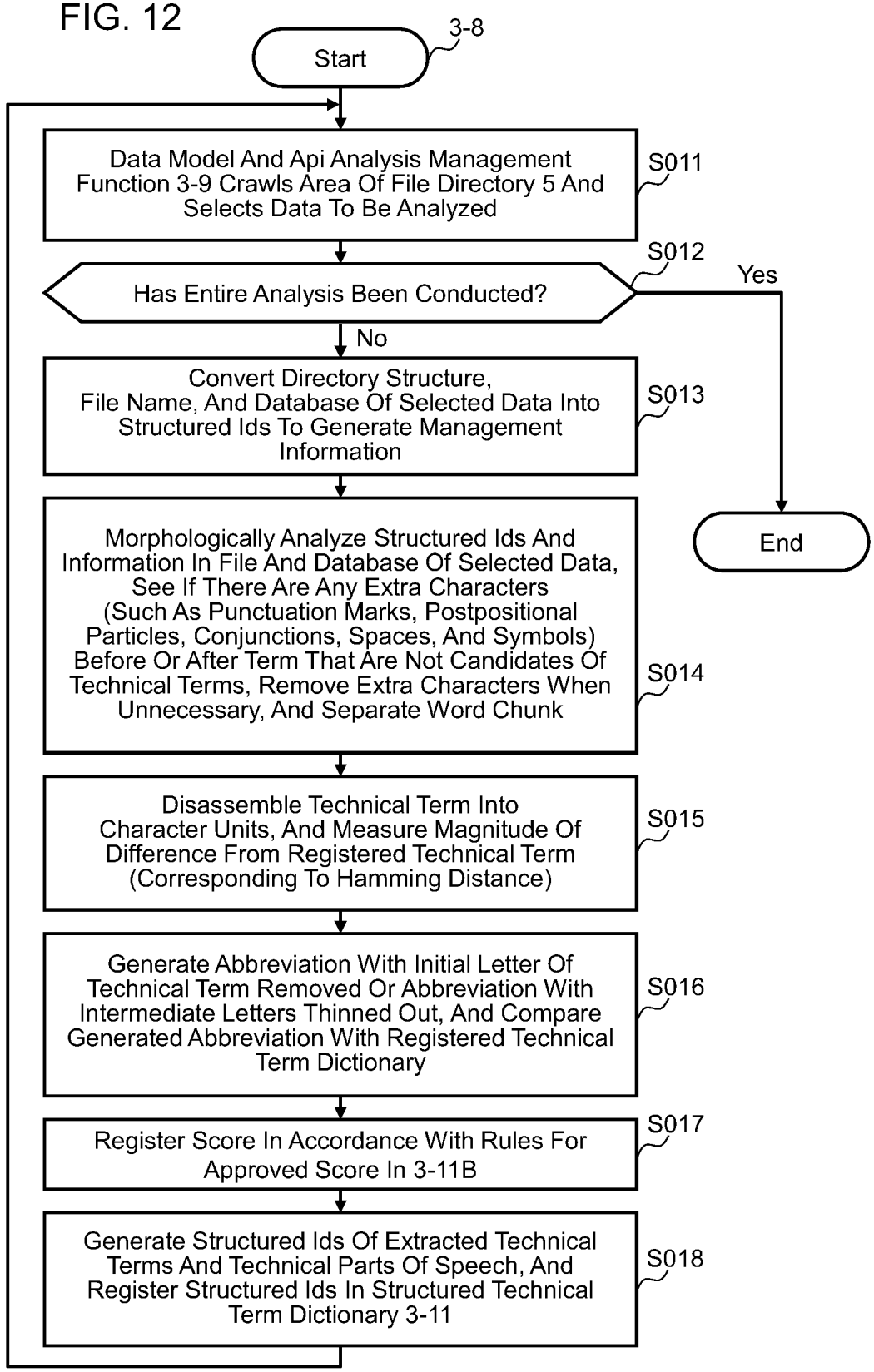
FIG. 12 is the procedure of processes carried out by a technical term analysis management function.

FIG. 12 is the procedure of processes carried out by the technical term analysis management function 3-8. The technical term analysis management function 3-8 crawls the database 4 and the region of the file directory 5 to select data to be analyzed (S011). Thereafter, when data to be selected are left so that the entire analysis has not been conducted ((No) in S012), the directory structure, the file name, and the database of the selected data are converted into the structured IDs to generate management information (S013). On the other hand, when the entire analysis is completed ((Yes) in S012), the action is terminated.

When there is a target to be analyzed, the content of the file is opened, and the structured IDs of the selected data and the information in the file and the database is morphologically analyzed to see if there are any extra characters (such as punctuation marks, postpositional particles, conjunctions, spaces, and symbols) before or after the term that are not candidates of technical terms, the extra characters are removed when unnecessary, and the word chunks are separated (S014).

The technical terms are each then disassembled into character units, and the magnitude of the difference from each registered technical term is measured. The difference is determined by using Hamming distance or any other technique. The technical term analysis management function 3-8 identifies the determined difference as a distance that can be compared in terms of magnitude (S015). To process natural languages and abbreviations, an abbreviation based on the initial letters of a technical term or an abbreviation with intermediate letters thinned out is generated and compared with the registered technical term dictionary (S016). A score is then registered in accordance with the rules for the approved score in 3-11B. The difference in the distance in the process S015 is utilized to assign a superiority or inferiority to the score (S017). Structured IDs for the extracted technical terms and technical parts of speech are then generated and registered in the structured technical term dictionary 3-11 (S018).

Figures 13, 14:
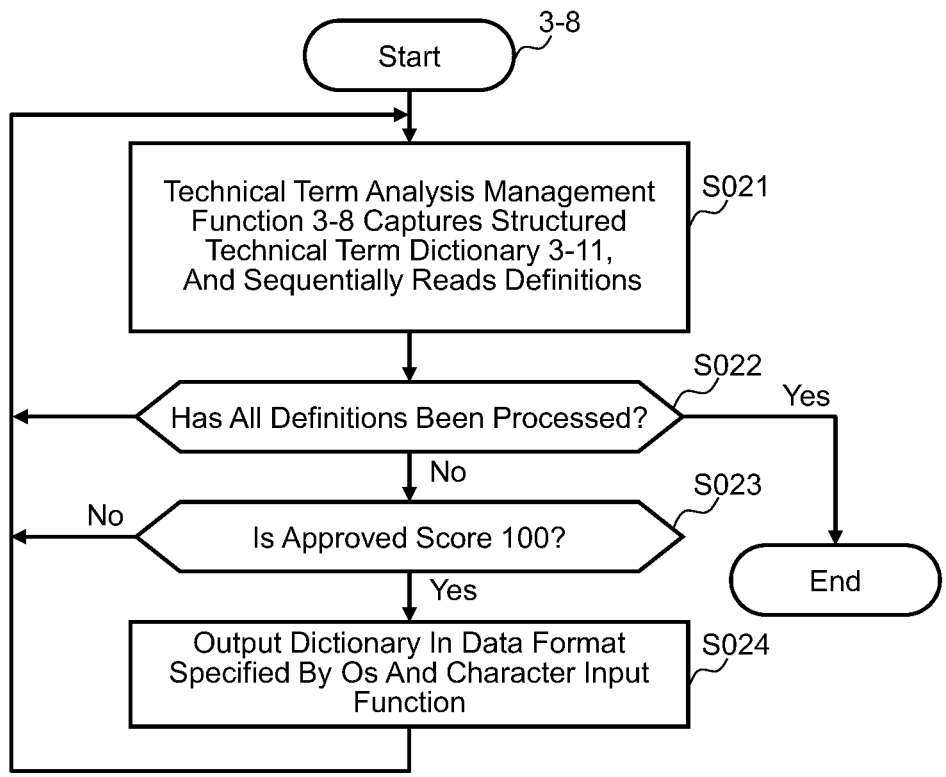
FIG. 13 is the procedure of generating an input aid dictionary from the technical term dictionary.
FIG. 14 is an example of the input aid dictionary.

FIG. 13 is the procedure of generating the input aid dictionary 1-5 from the structured technical term dictionary 3-11. The technical term analysis management function 3-8 generates the input aid dictionary to increase the accuracy with which the function 3-8 can correct variations and to govern a term to be used. The technical term analysis management function 3-8 first captures the structured technical term dictionary 3-11 and sequentially reads the definitions therein (S021). The function 3-8 then checks whether the entire dictionary has been processed (S022), and when there are no definitions to be processed ((Yes) in S022), the action is terminated. When there are definitions to be processed ((No) in S022), the function 3-8 checks if the approved score is 100 (S023). When the approved score is 100, the function 3-8 determines that the read definition is good enough to be approved and made known ((Yes) in S023), and outputs the input aid dictionary in a data format specified by the OS and a character input function (S024). On the other hand, when the approved score is smaller than 99, the function 3-8 determines that the read definition is not reliable enough to be made known ((No) in S023), and returns to the next definition reading cycle.

FIG. 14 is an example of the input aid dictionary 1-5. The information 1-5 generated in the input aid dictionary generation procedure (S021 to S024) by the technical term analysis management function 3-8 described above contains "spelling" information 1-5-1, which is a first character expression input by the user 9 via an input apparatus, a term 1-5-2 produced by the conversion into a Kanji or alphabetical word, classification information 1-5-3, which is specified by the OS run on the user terminal and the character input function, a priority 1-5-4, in accordance with which the conversion is performed, and other pieces of information.

Example 2

In Example 1 described above, the description has been primarily made of the analysis of information generated by the multiple vendors, automatic generation of the structured technical term dictionary 3-11, the mission management information 3-12, and the input aid dictionary 1-5, and the actions of the facility operation automation system 100 using the information and dictionaries.

In the following description, Example 2 shows a method for managing the degree of contribution made by a mission selected by the facility operation automation system, or the results selected, for example, by the IDs, and payment information.

Figure 15:
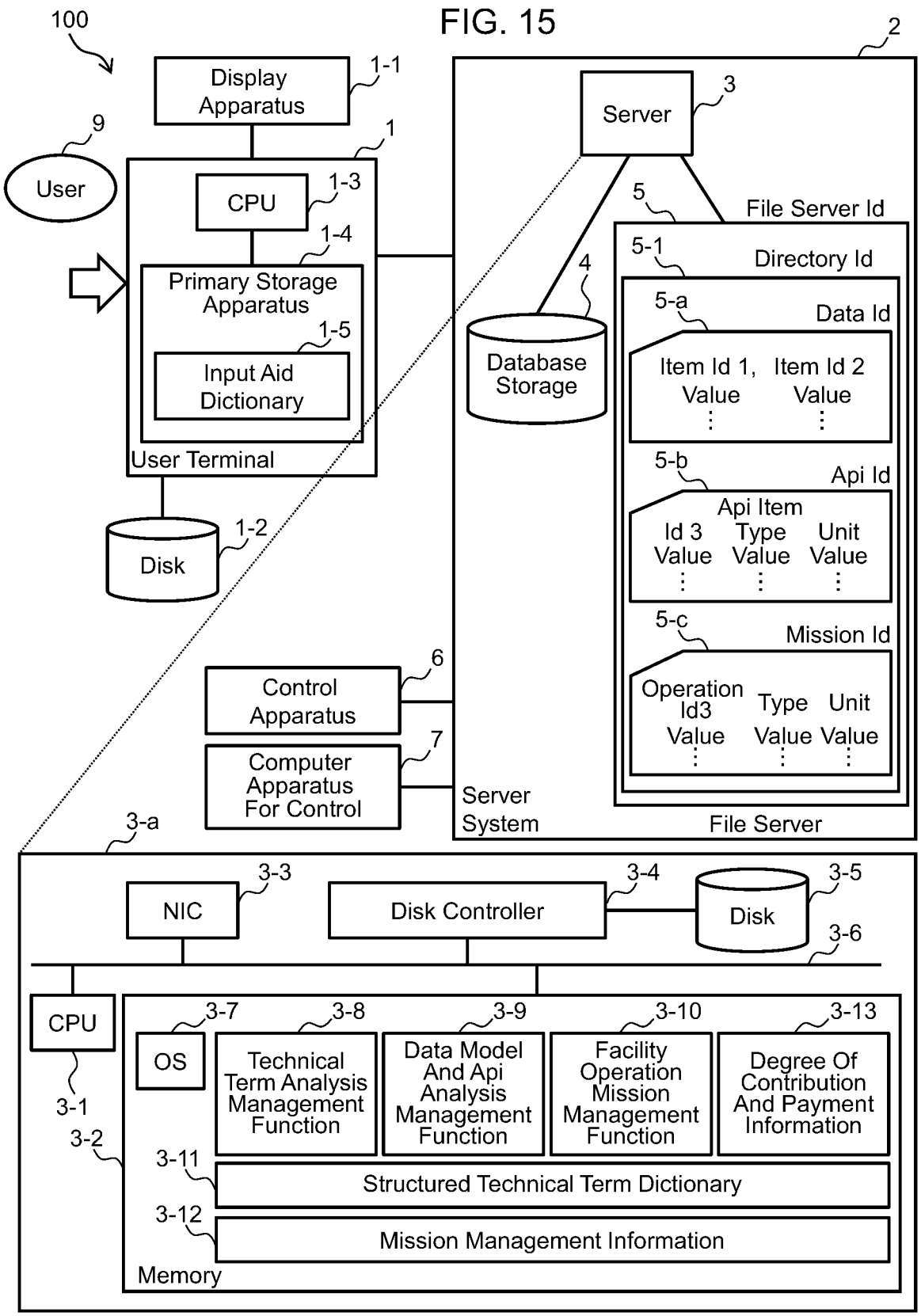

FIG. 15 has a structure roughly the same as the configuration shown in FIG. 1, but FIG. 15 further contains information, for example, on the AI that performs the analysis, the degree of contribution made by a selected and executed mission, and payment information according to the contribution (degree of contribution and payment information 3-13).

FIG. 16 is an example of a table for managing degree of contribution and the payment information 3-13. The table for managing the degree of contribution and the payment information manages a structured ID 3-13-1, which identifies a target process, information 3-13-2 on data, a mission, and an output result involving the AI, a degree of contribution 3-13-3, and an amount of payment 3-10-4.

FIG. 17 shows a procedure in accordance with which the facility operation mission management function 3-10 calculates the degree of contribution and the payment information. When the facility operation mission management function 3-10 acquires an event in which a mission has been performed from the user terminal 1, the control apparatus 6, or the computer apparatus for control 7 (S031), the function 3-10 evaluates whether a multi-vendor AI or an analysis program has contributed to the mission (S032). When no contribution is made ((No) in S032), the update process is terminated. When there is a contributing multi-vendor AI or analytical program ((Yes) in S032), the usage of the structured technical term dictionary 3-11 and the approved score of the mission management information 3-12 are updated, and the degree of contribution and the payment information are updated (S033).

Figure 18:
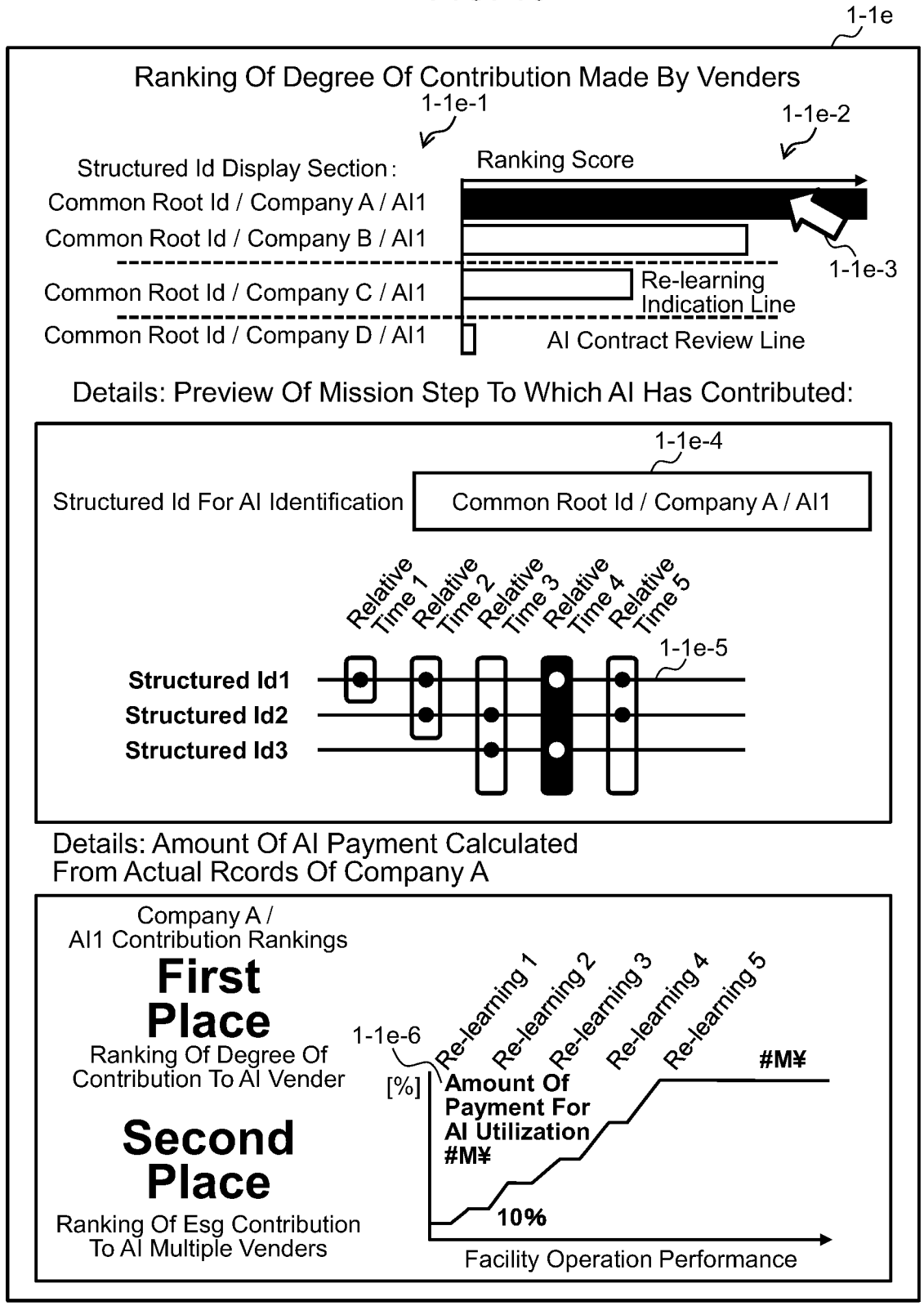
FIG. 18 is an example in which multi-vendor AI and information on the management of the degree of contribution made by an analysis program is displayed on the display apparatus of the user terminal.

FIG. 18 is an example in which the multi-vendor AI and information on the management of the degree of contribution made by the analysis program is displayed on the display apparatus 1-1 of the user terminal 1.

A screen 1-1e for displaying the degree of contribution and the payment made by the multiple vendors shows a structured ID section 1-1e-1 showing the AI having made contribution and analysis application rankings, and an analysis application ranking score 1-1e-2. When the structured ID section 1-1e-1 or the ranking score 1-1e-2 is clicked (1-1e-3), detailed information is displayed (1-1e-4). In a preview of a mission step to which the AI has contributed, the location where the AI or the analysis program has contributed to the mission is highlighted (1-1e-5).

The amount of AI payment calculated from actual records, the rankings, payment transition 1-1e-6, and other pieces of information are further displayed.

Example 3

In Examples 1 and 2 described above, the description has been primarily made of the processes in which the facility operation automation system 100 automatically operates.

In Example 3 below, how the user 9 improves the accuracy of the automatic operation by inputting further information into the facility operation automation system 100 will be described.

Figure 19:
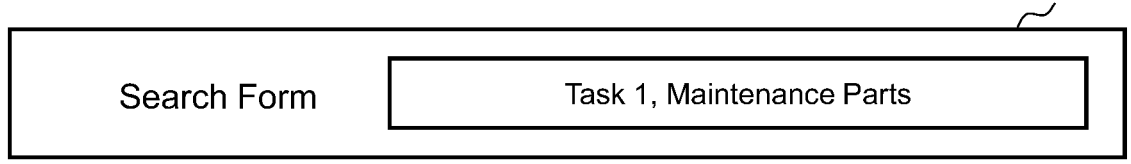
FIG. 19 shows a screen example displayed on the display screen of the user terminal when the facility operation automation system searches for information managed thereby.

FIG. 19 shows a screen example 1-1f displayed on the display screen 1-1 of the user terminal 1 when the facility operation automation system 100 searches for information managed thereby. The screen has an input form where the user 9 can input words that the user 9 desires to search for, including delimiters such as spaces.

Figure 20:
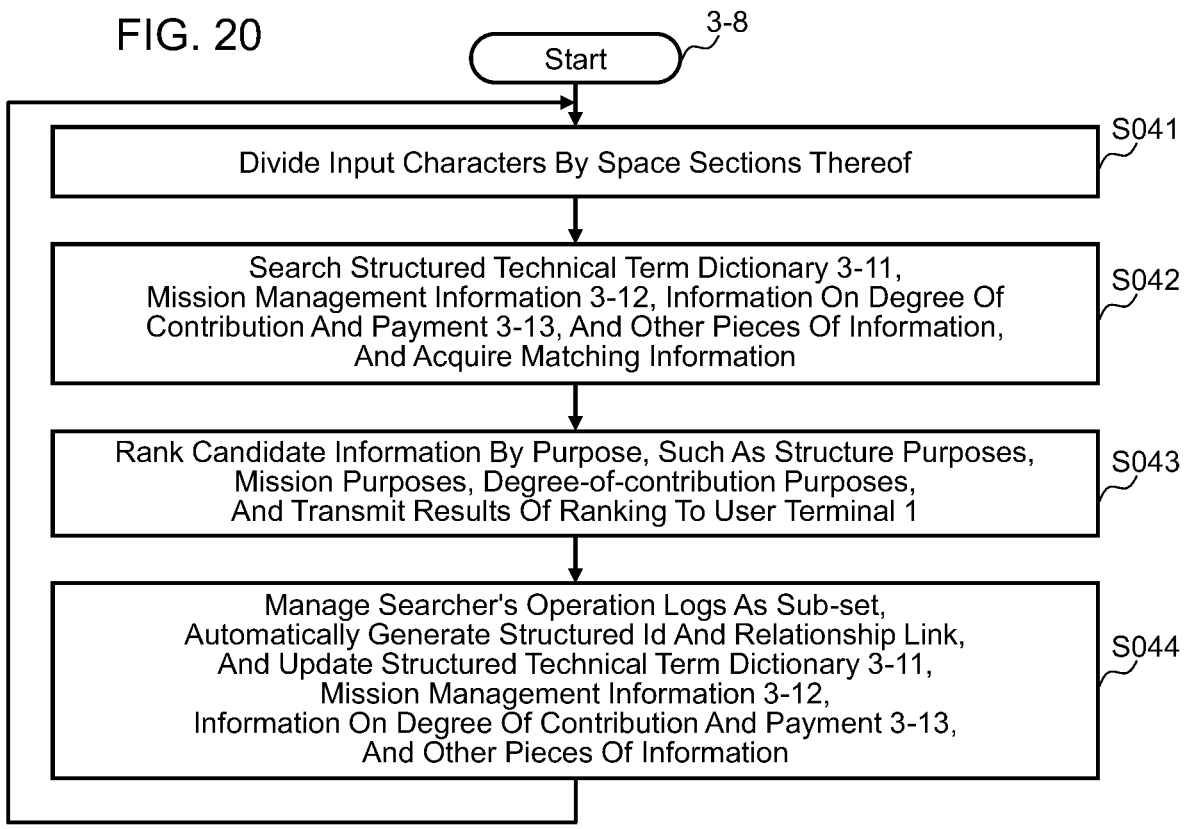
FIG. 20 is the procedure of processes carried out when the technical term analysis management function receives a search string from a user.

FIG. 20 is the procedure of processes carried out when the technical term analysis management function 3-8 receives a search string from the user. The technical term analysis management function 3-8 divides the string by the space sections of the received input characters (S041). The technical term analysis management function 3-8 then searches the structured technical term dictionary 3-11, the mission management information 3-12, the information on the degree of contribution and the payment 3-13, and other pieces of information and acquires matching information (S042). The technical term analysis management function 3-8 ranks the candidate information by purpose, such as structure purposes, mission purposes, and degree-of-contribution purposes, and transmits the result of the ranking to the user terminal 1 (S043). The technical term analysis management function 3-8 manages the searcher's operation logs as a subset, automatically generates structured IDs and relationship links, and updates the structured technical term dictionary 3-11, the mission management information 3-12, the information on the degree of contribution and the payment 3-13, and other pieces of information.

The process steps described above update the approved scores and further improve the reliability of the information managed by the facility operation automation system.

Figure 21:
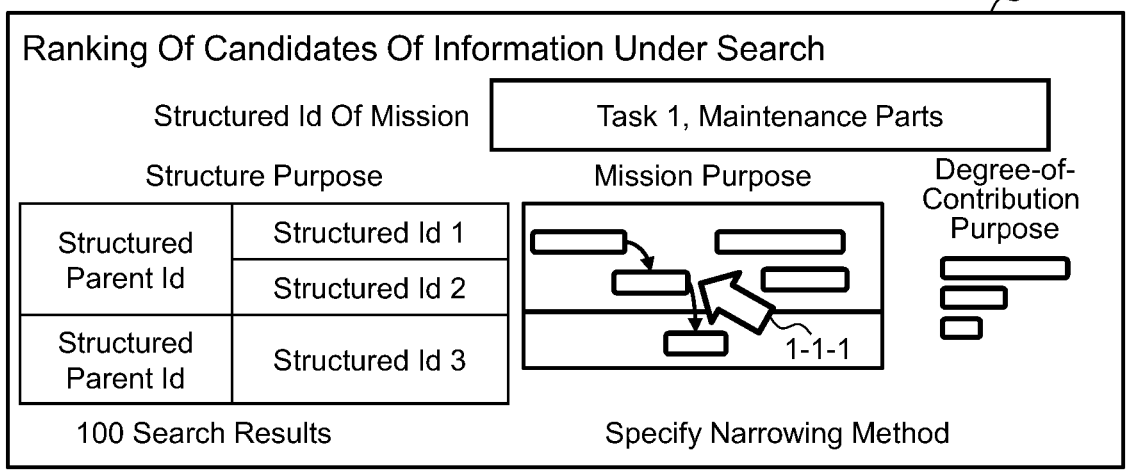
FIG. 21 is an example of information on a search result displayed on the display apparatus.

FIG. 21 is an example 1-1g of information on a search result S043 displayed on the display apparatus 1-1. In normal searches, results are not ranked by purpose because the results are ranked by the frequency of occurrence, the usage trend, and other factors. The facility operation automation system, however, performs the management along with the current status information and other pieces of information, and therefore displays rankings by purpose according to the situation.

FIG. 22 is an example of a screen that presents the mission management information to the user and permits the user to make corrections. The user can specify a location to be corrected and make a correction by clicking with a mouse pointer 1-1-1 on a scene representation 1-1h, a Sankey representation 1-1i, or a Gantt Chart representation 1-1j. In the correction, the user can correct the expression, the management table, the relationship links, and the like, delete the definitions via a deletion setting button 1-1-3, and make a correction via a finalization setting button 1-1-2. An explicit correction and the finalization setting made by the user allow update of the approved score and an increase in the accuracy of the management information.

As described above, managing the dictionaries of information used in tasks and information on a mission including the order in which the tasks are chronologically processed allows the information to be handled in a relative time dimension, such as fast forward and rewind operations, by performing display and control in a time axis concept, unlike related-art AI that only displays output in response to input.

Mission management including time information for the facility operation can thus be achieved.

Using structured IDs to manage information required by the AI and labeling of the results achieved by the AI allows management of a task to which the analysis program contributes.

Disassembling the structured IDs in terms of delimiter and further in terms of character, and thinning and combining the divided characters allows recognition and correction of fluctuating abbreviations and the like generated by humans, as well as automation of the tasks.

Furthermore, bringing human input information closer to the information managed by utilizing the structured IDs, and providing the input aid dictionary, which allows unknown information including disturbance to be corrected to known information as much as possible, allows reduction in the computational cost for the analysis and automation of tasks that require human intervention for re-recognition and associating operation.

Example 4

In Example 1 described above, the description has been primarily made of the analysis of information generated by the multiple vendors, automatic generation of the structured technical term dictionary 3-11, the mission management information 3-12, and the input aid dictionary 1-5, and the actions of the facility operation automation system 100 using the information and dictionaries.

In Example 4 below, a description will be made of an example in which the facility operation automation system changes the level of the automatic operation and performs cooperative action according to an operator's skill level.

Figure 23:
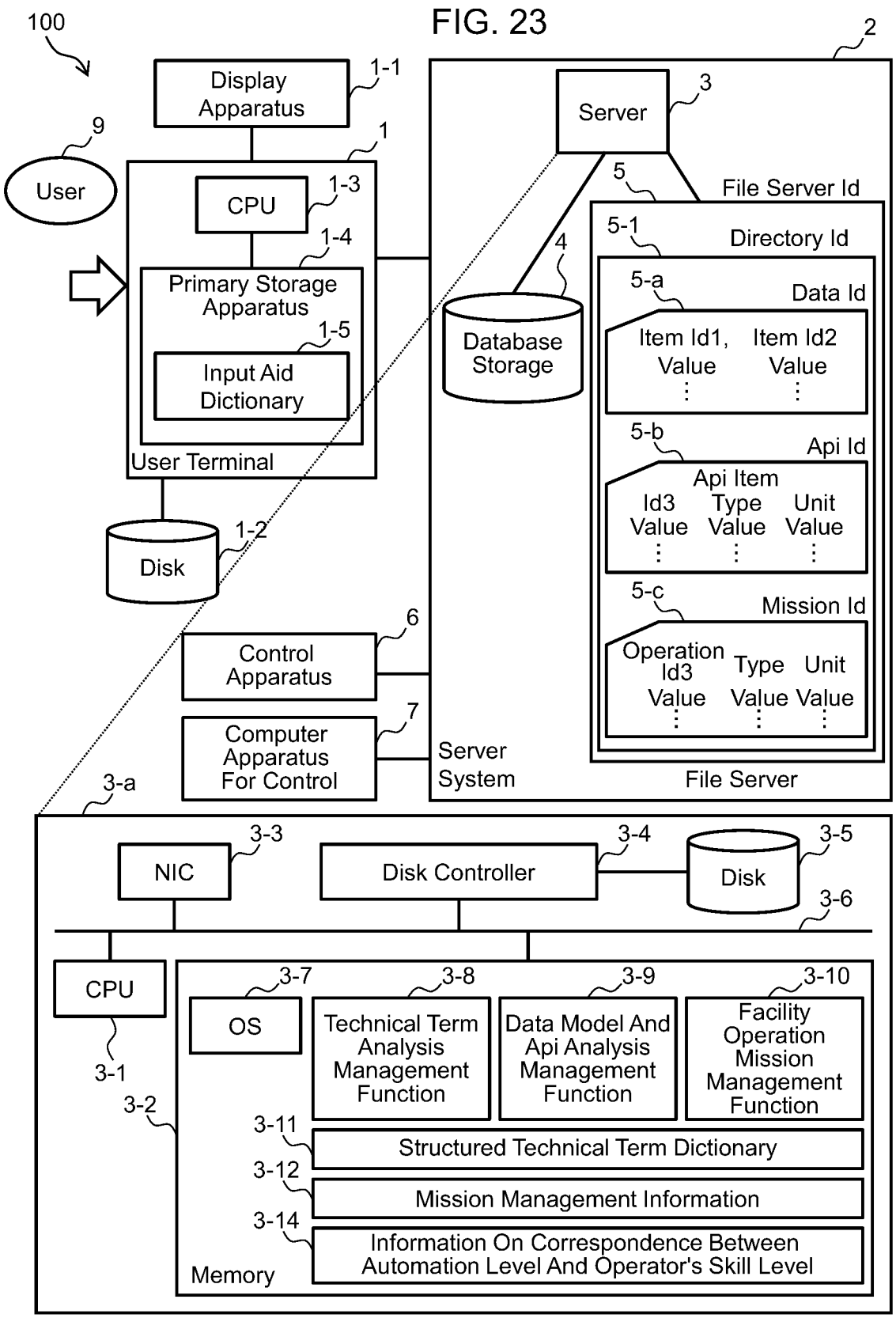
FIG. 23 is a conceptual diagram of the facility operation automation system in consideration of the level of automation of the facility operation and an operator's skill level.

FIG. 23 shows roughly the same configuration as that shown in FIG. 1, but a table 3-14 showing the correspondence between the level of automation of the facility operation and the operator's skill level.

FIG. 24 is an example of a table 3-12C, which shows the mission management information 3-12 to which information on the automation level is added. The present table 3-12 contains a mission ID column 3-12C-1, relationship link information 3-12C-2 relating to the mission, and an automation level column 3-12C-3.

In particular, the automation level is classified into a "full automation" level, which does not require any human involvement at all, an "eyes off" level, which requires the operator to respond to sudden changeover of driving authority but allows the operator to take their eyes off the facility, a "skill A" level, which requires a high-skill operator, and a "skill B" level, which allows even a low-skill operator to operate the facility. The levels described above form an automation level requirement required to carry out a mission.

FIG. 25 is an example of a table 3-14A, which defines possible combinations as the combination of the automatic operation level and the operator's level in the information 3-14 showing the correspondence between the automation level and the operator's skill level. The table 3-14A contains a mission ID column 3-14A-1, relationship link information 3-14A-2 relating to the mission, and a possible combination column 3-14A-3 as the combination of the automatic operation level and the operator's level.

FIG. 26 is an example of a table 3-14B, which defines the tiers of the structured IDs of a guidance tip corresponding to the operator's skill level. The table 3-14B contains operator identification ID 3-14B-1, a definition column 3-14B-2, which defines a facility of which the operator is qualified for operation, a definition column 3-14B-3, which defines the operator's level, and a definition column 3-14B-4, which defines a guidance tip in consideration of the operator's operation qualification and operating level.

In particular, the guidance tip is information for removing terms representing key portions in a manual or qualification exam questions, generating fill-in-the-blank guidance information, replacing a word tip that applies to each of the blanks with a structured technical part of speech when displayed, and setting a tier to which a detailed tip is provided.

When the structured ID 1 has one tier, only the "common root ID" is provided with a tip, so that there is almost no tip. The structured ID becomes longer from the "two-tier structured ID" to the "five-tire structured ID", and more detailed tip is displayed for a longer structured ID.

In the information 3-14 showing the correspondence between the automation level and the operator's skill level, an operator A does not have a very high skill for a target facility and has an operator level of the skill B, so that the structured ID's tier 3-14B-4a in the guidance tip have five tiers.

On the other hand, an operator B has a high skill for a target facility and has an operator level of the skill A, so that fewer guidance tips are provided, and the structured ID's tier 3-14B-4b have three tiers.

"See appendix for details" indicates that the operator is prompted to follow the information also to detailed information in the separate volume and guidance that cannot be shown in the manual is then displayed.

FIG. 27 is an example of a screen that displays the automatic operation level and the response of the operator in charge in the mission management information 3-14 on the display apparatus 1-1 of the user terminal 1. A scene representation 1-1k shows that the automatic operation level "Operation level/eyes off" is displayed along with information relating to the mission, and that the facility is scheduled to be operated jointly with the operators A and B. To make a correction, the mouse pointer 1-1-1 is used to specify a target and perform the correction, and the finalization setting button 1-1-2 or the deletion setting button 1-1-3 is then pressed to finalize the edit.

A Gantt chart representation 1-1m shows not only the automatic operation level but the categories of the operators in the structured swim-lane, whereby how the operators are involved in the automatic operation can be checked in the chronological work.

Figure 28:
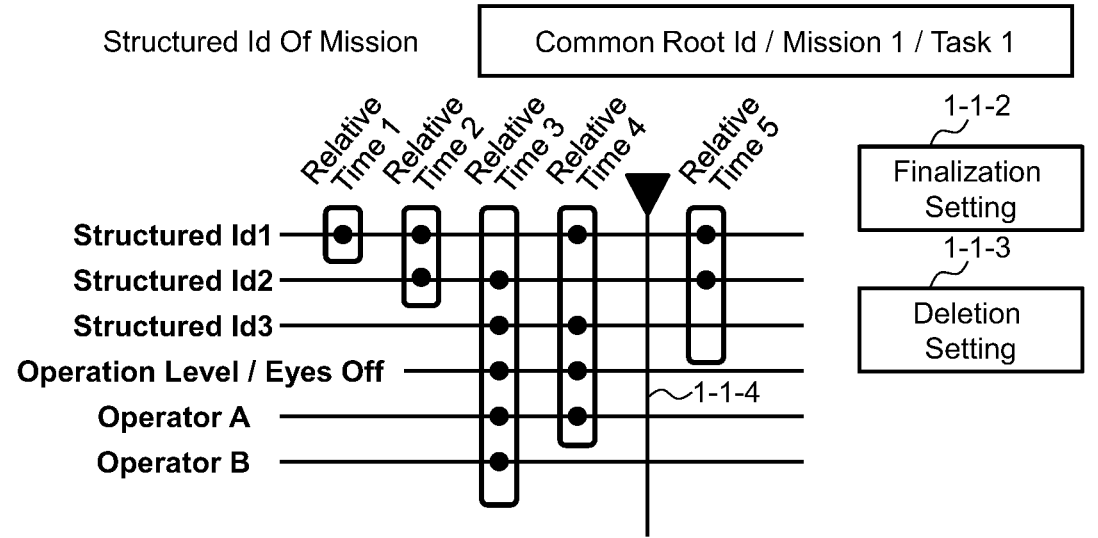
FIG. 28 is an example of a screen in which guidance tailored to the automatic operation level and the operator's level is displayed in a fill-in-the-black manner and a tip tailored to the operator's level is displayed.

FIG. 28 is an example of a screen in which guidance tailored to the automatic operation level and the operator's level is displayed in a fill-in-the-black manner and a tip tailored to the operator's level is displayed.

The facility operation mission management function 3-10 transmits the current execution status to the user terminal 1, and the current execution position is displayed at a cursor 1-1-4 on a screen 1-1n of the display terminal 1-1.

A screen 1-1p shows an example of a guidance screen for the operator A. In the information 3-14 showing the correspondence between the automation level and the operator's skill level, the operator A does not have a very high skill for a target facility and has an operator level of the skill B, so that the structured ID's tier 3-14B-4a in the guidance tip have five tiers. Therefore, in the guidance screen for the operator A, the tips are clearly shown as "Common root ID/C1/Section A/Measurement facility type/Ultrasonic sensor/*", which is the five tiers out of six-tier information "Common root ID/C1/Section A/Measurement facility type/ Ultrasonic sensor/I1", and guidance hidden by the character "*" is generated in the sixth tier.

On the other hand, a screen 1-1q shows an example of a guidance screen for the operator B. In the information 3-14 showing the correspondence between the automation level and the operator's skill level, the operator B has a high skill for a target facility and has an operator level of the skill A, so that fewer guidance tips are provided, and guidance is so generated that not only the name of the target facility but the threshold for confirmation are hidden in a fill-in-the-blank manner. In the information 3-14 showing the correspondence between the automation level and the operator's skill level, the tier 3-14B-4a of the structured ID of the operator B has three tiers. Therefore, in the guidance screen for the operator B, the tips are clearly shown as "Common root ID/C1/Section A/*", which is the three tiers out of six-tier information "Common root ID/C1/Section A/Measurement facility type/Ultrasonic sensor/I1", and guidance hidden by the character "*" is generated afterwards.

The fill-in-the-blank guidance allows generation of a fill-in-the-blank question because the facility operation mission management function 3-10 understands the parameter information used in the automatic facility operation. The guidance information thus allows humans and the automatic facility operation system to automatically operate the plant based on a concept in line with similar human language thinking, and in some cases, allows the operation to be transferred to humans.

The amount of guidance information can thus be adjusted in accordance with the operator's level. Furthermore, in accordance with the level of the operation skill required for the operator, terms and the like corresponding to the structured IDs can be omitted from the manual document to create a training document that questions the knowledge of the missing portions. The training document according to the operator's level is then presented to the operator to request input to the missing portions, and the operator's level is updated based on the result of the input, whereby training and assessment of the operator can be efficiently performed.

Figure 29:
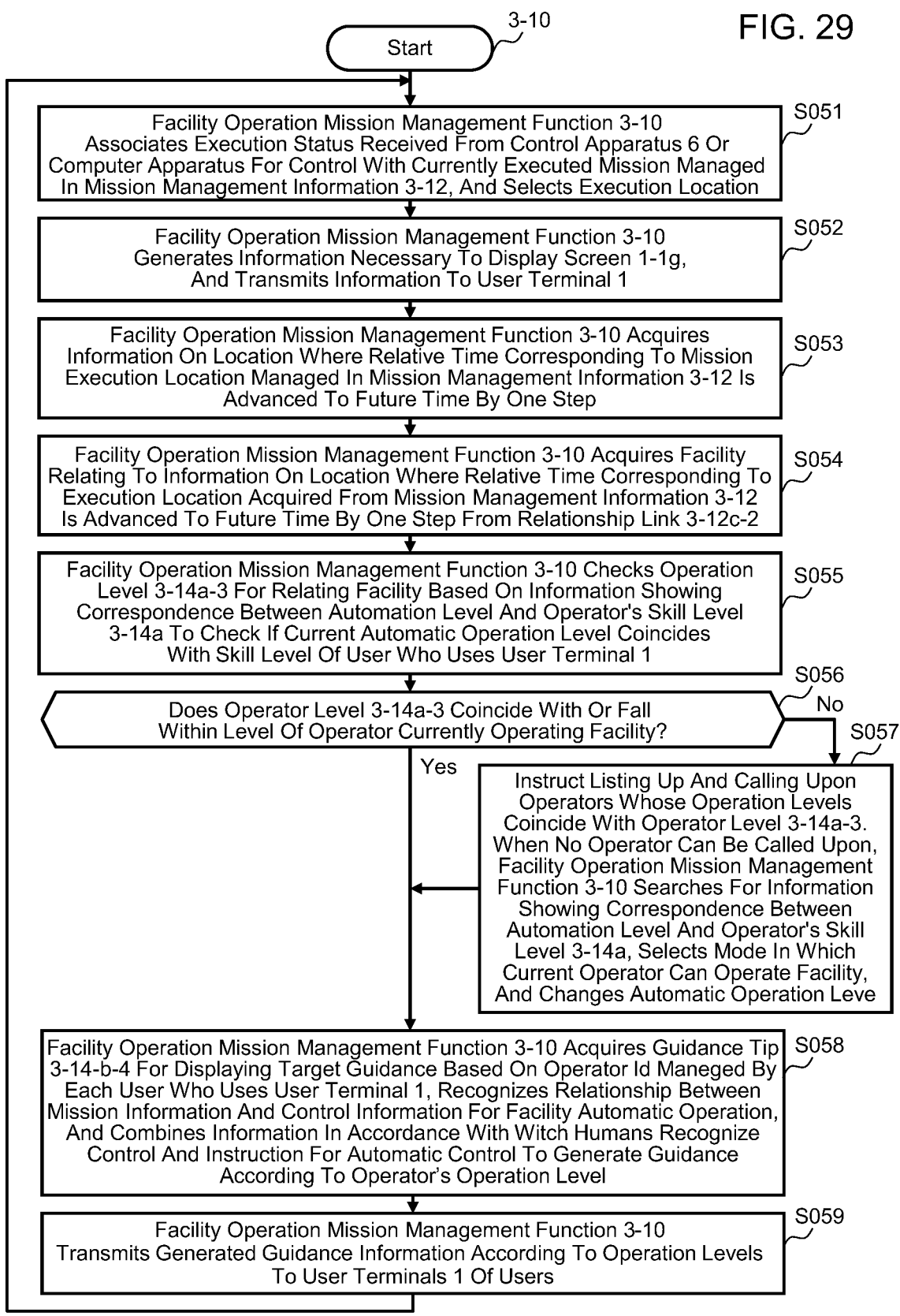
FIG. 29 is the procedure of a facility operation automation process using an automatic level and operator level management, and automatic generation of a guidance content according to the operation level and the operator's level.

FIG. 29 is the procedure of a facility operation automation process using an automatic level and operator level management, and automatic generation of a guidance content according to the operation level and the operator's level.

The facility operation mission management function 3-10 associates the execution status received from the control apparatus 6 or the computer apparatus for control 7 with the currently executed mission managed in the mission management information 3-12, and selects an execution location (S051).

The facility operation mission management function 3-10 generates information necessary to display the screen 1-1g, and transmits the information to the user terminal 1 (S052).

The facility operation mission management function 3-10 acquires information on the location where the relative time corresponding to the mission execution location managed in the mission management information 3-12 is advanced to future time by one step (S053).

The facility operation mission management function 3-10 acquires a facility relating to the information on the location where the relative time corresponding to the execution location acquired from the mission management information 3-12 is advanced to future time by one step from the relationship link information 3-12C-2 (S054).

The facility operation mission management function 3-10 checks the operation level 3-14A-3 for the relating facility based on the information showing the correspondence between the automation level and the operator's skill level 3-14 to check if the current automatic operation level coincides with the skill level of the user who uses the user terminal 1 (S055).

The facility operation mission management function 3-10 checks to see if the operator level 3-14A-3 coincides with or fall within the level of the operator currently operating the facility (S056).

When the operator level 3-14A-3 does not coincide with or does not fall within the level of the operator currently operating the facility ((No) in S056), the function 3-10 instructs listing up and calling upon operators whose operation levels coincide with the operator level 3-14A-3. When no operator can be called upon, the facility operation mission management function 3-10 searches the information showing the correspondence between the automation level and the operator's skill level 3-14, selects a mode in which the current operator can operate the facility, and changes the automatic operation level (S057).

When the operator level 3-14A-3 coincides with or fall within the level of the operator currently operating the facility ((Yes) in S056), the facility operation mission management function 3-10 acquires a guidance tip 3-13-B-4 for displaying target guidance based on the operator ID managed by each user who uses the user terminal 1, recognizes the relationship between the mission information and control information for facility automatic operation, and combines information in accordance with which humans recognize the control and an instruction for automatic control to generate guidance according to the operator's operation level (S058).

The facility operation mission management function 3-10 then transmits the generated guidance information according to the operation levels to the user terminals 1 of the users (S059).

Repeating the processes S051 to S059, the facility operation mission management function controls the operation levels and generates guidance according to the operator levels, and executes the process of achieving both the cooperation between the facility operation automation and the operators as well as improvement of the operators' levels.

As described above, managing the dictionaries of information used in tasks and information on missions, including the order in which the tasks are chronologically processed, allows management of the relationship between instructions for control performed in the facility operation automation and the contents of operations recognized and performed by humans.

Furthermore, generation of guidance formed of partially blanked mission information allows both machines and operators to recognize portions automated by the facility operation automation system as well as facility targets the operation of which may be transferred to humans, operation methods, evaluation criteria, control target values, and control target statuses.

Guidance tailored to an operator's level can be generated by adjusting the locations where the mission information is blanked in accordance with the operator's level, and adjusting the length of the structured ID to control the degrees of abstraction and concreteness of the tips.

The present system further manages interrelationships that cannot be described in a single mission information, for example, prompts an operator to refer to an appendix for details, and therefore provides a skilled operator with no information that prompts the operator to refer to the appendix or provides only highly abstract guidance, such as mission information in the form of chapters or sections, whereby guidance tailored to the speed of thinking of the skilled operator can be provided.

On the other hand, for a less skilled operator, interrelationships that cannot be described in single mission information, such as an appendix to which the operator is prompted to refer, can be displayed as a supplement, so that detailed operation instructions can be shown in the form of guidance by tracing the tier structure of the chapters and sections, and the operator can ascertain in detail the range over which the facility operation automation can be performed.

The operator can actually fill the blanks in the screens 1-1$p$ and 1-1$q$ with answers, and check the answers with the support of the input aid dictionary 1-5. In this process, the fact that choices of answers to the blanks are registered in the input aid dictionary allows the human thinking and the information handled by the facility operation automation system to coincide with each other through guidance and questions for training purposes.

Furthermore, the information can be handled in a relative time dimension, such as fast forward and rewind operations, by performing display and control in a time axis concept.

Mission management including time information for the facility operation can thus be achieved.

As described with reference to Examples, the disclosed facility operation automation system is a facility operation system including the file server 5 as a storage apparatus, the server 3 as an arithmetic operation apparatus, and the control apparatus 6, which controls an instrument involved in the facility operation.

The file sever 5 stores at least a plurality of types of existing data including data relating to management of the instrument and data on actual records of the instrument, information on the path structure of the plurality of types of existing data, mission information that is information on a plurality of tasks in the facility operation, and information on the path structure of the mission information.

The server 3 extracts information on the data meanings of terms contained in the plurality of types of existing data based on the plurality of types of existing data and the path structure of the plurality of types of existing data, generates information on the degree of association between the plurality of terms based on the extracted information on the data meanings, generates the mission management information 3-12 based on the mission information, the path structure of the mission information, and the information on the degree of association between the terms, the information 3-12 including information on the meaning of each of the plurality of tasks relating to the facility operation and chronological information on the plurality of tasks, identifies a task to be performed based on information acquired from the control apparatus and the mission management information 3-12, generates control instruction data for the control section 6 based on the identified task to be performed and the mission management information 3-12, and transmits the control instruction data to the control apparatus 6.

The configuration and actions described above allow multiple vendors to cooperate with each other and contribution to the automation of the facility operation, for example, of a plant that used to require human intervention.

Task data that are the plurality of types of existing data contain terms in expressions used in the tasks and structured identification information for identifying meanings, and the structured identification information shows a structured inclusion relationship based on at least one of directories in the tier structure, database schema tables, column and row identifiers in the database schema, and the inclusion relationships in the chapter and section structure of a manual document.

The server 3 uses the structured inclusion relationship to create the structured technical term dictionary 3-11, which is a dictionary of the meanings of the terms.

A dictionary of technical terms that cannot be handled by related-art morphological analysis can therefore be automatically generated.

The server 3 further disassembles the identification information into character units, performs thinning and/or automatically generates abbreviations, compares a term in an expression with the structured identification information, and determines the difference between information under comparison as a sign distance to assess the relationship between the task data.

A precise data meaning can thus be automatically identified.

The server 3 adjusts and compares the number of concatenated identifiers in a string with delimiters representing the inclusion relationship, interprets the meaning and generates a dictionary even when the term in the expression does not completely coincide with the structured identification information for identifying the meaning.

Variations of terms used in the same meaning can thus be corrected.

The server 3 uses as a trigger an input from the control apparatus 6, the computer apparatus for control 7, and/or the user terminal 1, determines the priority of information on a task to be performed based on the degree of coincidence of the structured identification information with the input information, and outputs the priority as information corresponding to the input information.

The difference between the input information and the generated structured identification information can be assessed and output.

The server 3 controls the selected priority by recognizing a task having been corrected and/or approved via the user terminal 1, and selects and executes the task having been approved with priority over automatically generated but unapproved information.

Therefore, assessment of the task can be corrected by the user's input, and the task performed by the user can be faithfully automated.

The server 3 manages the types, the assessment axes, and the degree of contribution of a plurality of analysis programs having been supplied by a plurality of venders and having contributed to the automation of a task based on execution information from the user terminal 1, the control apparatus 6, and/or the computer apparatus for control 7, and controls the priority of selection of a selected task.

The server 3 can calculate the amounts of payment to the vendors based on the degree of contribution of the analysis programs.

The plurality of programs can thus be compared to each other and assessed in the multi-vendor environment, and the result of the assessment can be reflected, for example, in the payment to the vendors.

The server 3 has a table (skill level correspondence table 3-14) that recognizes the currently performed task and a task to be performed in the future based on the execution information from the user terminal 1, the control apparatus 6, and the computer apparatus for control 7, and manages the level of the automatic operation required for the tasks and the operator's operation skill level.

The server 3 further has a table (3-14B) that recognizes the currently performed task and a task to be performed in the future based on the execution information from the user terminal, the control apparatus, and the computer apparatus for control, and manages the tasks with the operator's operation skill level and guidance tip information identified by the structured identification information associated with each other.

When the automatic operation level and the operator's operation skill level do not coincide with each other, the server 3 can issue an instruction of calling upon operators having skills that coincide with the automatic operation level.

When the automatic operation level and the operator's operation skill level do not coincide with each other, the server 3 can automatically change the automatic operation level in accordance with the operator's skill level.

Therefore, when it is difficult to perform machine control, the automatic operation level and the operator's operation skill level are caused to coincide with each other, and when the automatic operation needs to transition to the operator's operation, smooth transition according to the operator's operation skill can be made, whereby operation mutually performed by the machine and humans is achieved.

In accordance with the operation skill level required for the operator of an instrument relating to the facility operation, the server 3 can omit a portion corresponding to the structured identification information from the manual document to create a training document that questions about the knowledge of the omitted portion.

Furthermore, the server 3 further performs the management with the operation skill level associated with the operator, presents the operator the training document according to the operator's level to request input to the omitted portion, and updates the operator's level based on the result of the input.

The training and assessment of the operator can thus be efficiently performed.

The present invention is not limited to Examples described above and includes a variety of variations. For example, the aforementioned Examples have been described in detail to describe the present invention in an easy-to-understand manner, and does not necessarily include all the configurations described above. Any of the configurations can be deleted or replaced, and any configuration can be added.

REFERENCE SIGNS LIST

1: User terminal, 1-1: Display apparatus, 1-2: Disk, 1-3: CPU, 1-4: Primary storage apparatus, 1-5: Input aid dictionary, 2: Server system, 3: Server, 3-1: CPU, 3-2: Memory, 3-3: Network interface card (NIC), 3-4: Disk controller, 3-5: Disk, 3-6: Bus, 3-7: OS, 3-8: Technical term analysis management function, 3-9: Data model and API analysis management function, 3-10: Facility operation mission management function, 3-11: Structured technical term dictionary, 3-12: Mission management information, 3-13: Degree of contribution and payment information, 4: Database storage, 5: File server, 5-1: directory ID, **5-*a*: History data, 5-*b*: API definition, 5-*c*: Mission information, 9: User, 100**: Facility operation automation system

The invention claimed is:

1. A facility operation system comprising:
a storage apparatus;
an arithmetic operation apparatus; and
a control apparatus that controls an instrument involved in facility operation,
wherein the storage apparatus
stores at least a plurality of types of existing data including data relating to management of the instrument and data on actual records of the instrument, information on a path structure of the plurality of types of existing data, mission information that is information on a plurality of tasks in the facility operation, and information on a path structure of the mission information,
the arithmetic operation apparatus
extracts information on data meanings of terms contained in the plurality of types of existing data based on the plurality of types of existing data and the path structure of the plurality of types of existing data, generates information on a degree of association between the plurality of terms based on the extracted information on the data meanings, generates mission management information based on the mission information, the path structure of the mission information, and the information on the degree of association between the terms, the mission management information including information on a meaning of each of the plurality of tasks relating to the facility operation and chronological information on the plurality of tasks, identifies a task to be performed based on information acquired from the control apparatus and the mission management information, and generates control instruction data for the control apparatus based on the identified task to be performed and the mission management information, and transmits the control instruction data to the control apparatus.

2. The facility operation system according to claim 1, wherein task data that are the plurality of types of existing data contain terms in expressions used in the tasks and structured identification information for identifying meanings, the structured identification information shows a structured inclusion relationship based on at least one of a directory in a tier structure, a database schema table, column and row identifiers in the database schema, and an inclusion relationship in a chapter and section structure of a manual document, and the arithmetic operation apparatus uses the structured inclusion relationship to create a dictionary of the meanings of the terms.

3. The facility operation system according to claim 2, wherein the arithmetic operation apparatus disassembles the identification information into character units, performs thinning and/or automatically generates abbreviations, compares a term in an expression with the structured identification information, and determines a difference between information under comparison as a sign distance to assess a relationship between the task data.

4. The facility operation system according to claim 3, wherein the arithmetic operation apparatus adjusts and compares the number of concatenated identifiers in a string with delimiters representing an inclusion relationship, and interprets a meaning and generates a dictionary even when the term in the expression does not completely coincide with the structured identification information for identifying the meaning.

5. The facility operation system according to claim 1, wherein the arithmetic operation apparatus uses as a trigger an input from the control apparatus, a computer apparatus for control, and/or a user terminal, determines a priority of information on a task to be performed based on a degree of coincidence of structured identification information with the input information, and outputs the priority as information corresponding to the input information.

6. The facility operation system according to claim 1, wherein the arithmetic operation apparatus controls a selected priority by recognizing a task having been corrected and/or approved via a user terminal, and selects and executes the task having been approved with priority over automatically generated but unapproved information.

7. The facility operation system according to claim 6, wherein the arithmetic operation apparatus manages types, assessment axes, and a degree of contribution of a plurality of analysis programs having been supplied by a plurality of venders and having contributed to automation of a task based on execution information from the user terminal, the control apparatus, and/or a computer apparatus for control, and controls priority of selection of a selected task.

8. The facility operation system according to claim 7, wherein the arithmetic operation apparatus calculates amounts of payment to the vendors based on the degree of contribution of the analysis programs.

9. The facility operation system according to claim 1, wherein the arithmetic operation apparatus has a table that recognizes a currently performed task and a task to be performed in the future based on execution information from a user terminal, the control apparatus, and a computer apparatus for control, and manages a level of automatic operation required for the tasks and an operator's operation skill level.

10. The facility operation system according to claim 9, wherein task data that are the plurality of types of existing data contain terms in expressions used in the tasks and structured identification information for identifying meanings, and the arithmetic operation apparatus has a table that recognizes a currently performed task and a task to be performed in the future based on execution information from a user terminal, the control apparatus, and a computer apparatus for control, and manages the tasks with an operator's operation skill level and guidance tip information identified by the structured identification information associated with each other.

11. The facility operation system according to claim 1, wherein the arithmetic operation apparatus executes recognizing a currently performed task and a task to be performed in the future based on execution information from a user terminal, the control apparatus, and a computer apparatus for control, recognizing individual operation skill levels of one or more operators who each use the user terminal, and when an automatic operation level and the operators' operation skill levels do not coincide with each other, issuing an instruction of calling upon operators having skills that coincide with the automatic operation level.

12. The facility operation system according to claim 1, wherein the arithmetic operation apparatus executes recognizing a currently performed task and a task to be performed in the future based on execution information from a user terminal, the control apparatus, and a computer apparatus for control, recognizing individual operation skill levels of one or more operators who each use the user terminal, and when automatic operation level and the operators' operation skill level do not coincide with each other, automatically changing the automatic operation level in accordance with the operators' skill levels.

13. The facility operation system according to claim 1, wherein task data that are the plurality of types of existing data contain terms in expressions used in the tasks and structured identification information for identifying meanings, wherein the arithmetic operation apparatus omits a portion corresponding to the structured identification information from a manual document in accordance with an operation skill level required for an operator of an instrument relating to the facility operation to create a training document that questions about knowledge of the omitted portion.

14. The facility operation system according to claim 13, wherein the arithmetic operation apparatus further performs the management with the operation skill level associated with the operator, presents the operator the training document according to the operator's level to request input to the omitted portion, and updates the operator's level based on the result of the input.

15. A facility operation method for controlling an instrument involved in facility operation, the method comprising:

causing a storage apparatus to store at least a plurality of types of existing data including data relating to management of the instrument and data on actual records of the instrument, information on a path structure of the plurality of types of existing data, mission information that is information on a plurality of tasks in the facility operation, and information on a path structure of the mission information, and causing an arithmetic operation apparatus to extract information on data meanings of terms contained in the plurality of types of existing data based on the plurality of types of existing data and the path structure of the plurality of types of existing data, generate information on a degree of association between the plurality of terms based on the extracted information on the data meanings, generate mission management information based on the mission information, the path structure of the mission information, and the information on the degree of association between the terms, the mission management information including information on a meaning of each of the plurality of tasks relating to the facility operation and chronological information on the plurality of tasks, identify a task to be performed based on information acquired from a control apparatus of the instrument and mission management information, and generate control instruction data for the control apparatus based on the identified task to be performed and the mission management information, and transmit the control instruction data to the control apparatus.

* * * * *